US00RE47394E

(19) United States
(12) Reissued Patent
Ruutu et al.

(10) Patent Number: US RE47,394 E
(45) Date of Reissued Patent: May 14, 2019

(54) WIRELESSLY TRANSFERRING DATA TO A PACKAGED ELECTRONIC DEVICE

(71) Applicant: WSOU Investments, LLC, Los Angeles, CA (US)

(72) Inventors: Jussi P.O. Ruutu, Espoo (FI); Jani P. J. Ollikainen, Helsinki (FI); Joni J. M. Jantunen, Helsinki (FI); Jukka P. Reunamaki, Tampere (FI); Mauri J. Honkanen, Tampere (FI); Jyri J. Hamalainen, Helsinki (FI); Jarmo T. Arponen, Espoo (FI)

(73) Assignee: WSOU Investments, LLC, Los Angeles, CA (US)

(21) Appl. No.: 15/255,481

(22) Filed: Sep. 2, 2016

Related U.S. Patent Documents

Reissue of:
(64) Patent No.: 9,369,959
Issued: Jun. 14, 2016
Appl. No.: 13/486,460
Filed: Jun. 1, 2012

U.S. Applications:
(60) Provisional application No. 61/553,599, filed on Oct. 31, 2011.

(51) Int. Cl.
*H04M 3/00* (2006.01)
*H04W 52/02* (2009.01)
*H04B 5/00* (2006.01)

(52) U.S. Cl.
CPC ..... *H04W 52/0225* (2013.01); *H04B 5/0031* (2013.01); *H04B 5/0062* (2013.01);
(Continued)

(58) Field of Classification Search
CPC combination set(s) only.
See application file for complete search history.

(56) References Cited

U.S. PATENT DOCUMENTS 5,790,946 A 8/1998 Rotzoll
6,311,276 B1 * 10/2001 Connery ..... G06F 1/26 726/13

(Continued)

FOREIGN PATENT DOCUMENTS

CN 102012829 A 4/2011
KR 2010-0105210 A 9/2010

(Continued)

OTHER PUBLICATIONS

Brown et al., "Updating Software in Wireless Sensor Networks: A Survey," 2006, Dept. of Computer Science, Ireland, Maynooth, Tech. Rep UCC-CS-2006-13-07, pp. 1-14.

(Continued)

*Primary Examiner* — Minh Dieu Nguyen
(74) *Attorney, Agent, or Firm* — Sean D. Burdick

(57) ABSTRACT

An electronic device has first and second circuitry. A wireless trigger signal at the first circuitry causes the second circuitry to power up to receive a second wireless signal. The second signal is according to a radio access technology for which the trigger signal is incompatible. In various embodiments the first circuitry (a low power receiver) may autonomously power up upon expiration of a timer. One or more security checks can be performed at various steps, each step conditional on passing the previous security check. The first circuitry operates at a lower power than the second circuitry which comprises a broadband radio. For example, the first circuitry might be a Bluetooth low energy receiver, and a trigger signal there causes a WLAN receiver to power up in order to download software/firmware updates or user content while the device is enroute between the manufacturer and end user.

42 Claims, 17 Drawing Sheets

(52) U.S. Cl.
CPC ..... *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/42* (2018.01)

(56) References Cited

U.S. PATENT DOCUMENTS

| | | | | |
|---|---|---|---|---|
| 7,735,114 | B2 * | 6/2010 | Kwan | H04L 63/08 455/410 |
| 7,860,952 | B2 * | 12/2010 | Haulin | H04W 8/245 370/351 |
| 8,270,962 | B1 * | 9/2012 | Mauer | G06F 8/65 455/404.1 |
| 8,384,525 | B2 * | 2/2013 | Ronkka | G06F 8/61 235/375 |
| 8,429,642 | B1 | 4/2013 | Cheng et al. | 717/173 |
| 8,589,541 | B2 * | 11/2013 | Raleigh | H04L 41/0893 455/405 |
| 8,712,394 | B2 * | 4/2014 | Bos | H04W 4/001 455/418 |
| 2002/0144030 | A1 | 10/2002 | Miller | 710/38 |
| 2003/0050103 | A1 * | 3/2003 | Tourrilhes | H04W 52/0229 455/574 |
| 2003/0182414 | A1 | 9/2003 | O'Neill | 709/223 |
| 2004/0003389 | A1 | 1/2004 | Reynar | 717/178 |
| 2005/0216559 | A1 | 9/2005 | Manion et al. | 709/205 |
| 2006/0109815 | A1 | 5/2006 | Ozer et al. | 370/329 |
| 2006/0112386 | A1 | 5/2006 | Moon et al. | 717/174 |
| 2007/0110010 | A1 | 5/2007 | Kotola | 370/338 |
| 2007/0243851 | A1 * | 10/2007 | Shoarinejad | H04W 52/288 455/343.2 |
| 2007/0275768 | A1 * | 11/2007 | Schnurr | H04W 4/02 455/567 |
| 2008/0064382 | A1 * | 3/2008 | Nam | G06F 11/1433 455/418 |
| 2008/0141015 | A1 | 6/2008 | Chalemin et al. | 713/2 |
| 2009/0017798 | A1 | 1/2009 | Pap | 455/414.1 |
| 2009/0031251 | A1 | 1/2009 | Kessler et al. | 715/810 |
| 2009/0083651 | A1 | 3/2009 | Kim | 715/771 |
| 2009/0094602 | A1 | 4/2009 | Ziskind et al. | 717/178 |
| 2009/0138876 | A1 | 5/2009 | Chang | 717/176 |
| 2009/0156200 | A1 | 6/2009 | Ishii | 455/425 |
| 2009/0168088 | A1 | 7/2009 | Rosenblatt | |
| 2009/0217373 | A1 * | 8/2009 | Stillerman | G06F 21/572 726/18 |
| 2009/0318124 | A1 * | 12/2009 | Haughn | G06F 8/65 455/418 |
| 2010/0100738 | A1 | 4/2010 | Thomsen et al. | 713/168 |
| 2010/0100766 | A1 * | 4/2010 | Bengtsson | H04W 24/06 714/23 |
| 2010/0169879 | A1 | 7/2010 | Takeda et al. | 717/177 |
| 2010/0199271 | A1 | 8/2010 | Harada | 717/168 |
| 2010/0295663 | A1 * | 11/2010 | Shoarinejad | H04W 52/288 340/10.1 |
| 2010/0313137 | A1 | 12/2010 | Fein et al. | 715/741 |
| 2010/0318712 | A1 | 12/2010 | Boldyrev et al. | 710/308 |
| 2011/0006882 | A1 | 1/2011 | Twitchell, Jr. | |
| 2011/0111743 | A1 | 5/2011 | Boukai et al. | 455/419 |
| 2011/0191764 | A1 * | 8/2011 | Piorecki | G06F 8/65 717/172 |
| 2011/0250849 | A1 | 10/2011 | Crowley | 455/67.11 |
| 2011/0254687 | A1 * | 10/2011 | Arponen | H04M 1/72525 340/540 |
| 2011/0255454 | A1 * | 10/2011 | Hauser | H04W 88/04 370/311 |
| 2012/0005497 | A1 * | 1/2012 | Tsukamoto | G06F 8/665 713/310 |
| 2012/0110568 | A1 | 5/2012 | Abel et al. | 717/178 |
| 2012/0171958 | A1 | 7/2012 | Cornett | 455/41.2 |
| 2012/0220337 | A1 * | 8/2012 | Conway | H04W 52/0216 455/553.1 |
| 2012/0272230 | A1 | 10/2012 | Lee | 717/173 |
| 2013/0303142 | A1 | 11/2013 | Burcham | 455/418 |
| 2014/0089710 | A1 * | 3/2014 | Yeh | H04W 52/0296 713/323 |

FOREIGN PATENT DOCUMENTS

| | | | |
|---|---|---|---|
| WO | WO-2004/074975 | A2 | 9/2004 |
| WO | 2007132282 | A1 | 11/2007 |
| WO | WO-2011/066215 | A1 | 6/2011 |

OTHER PUBLICATIONS

Shaheen et al., "Confidential and Secure Broadcast in Wireless Sensor Networks," 2007, IEEE 18th international Symposium on Personal, Indoor and Mobile Radio Communications, pp. 1-5.

Han et al., "Sensor network software update management: a survey," 2005, International Journal of Network Management Special Issue: Wireless Sensor Networks vol. 15, Issue 4, pp. 283-294.

"Core System Package [Low Energy Controller Volume] Part B, Link Layer Specification"; Bluetooth Specification, Version 4.0, vol. 6; Jun. 30, 2010; pp. 25-77.

"Specification vol. 1—Specification of the Bluetooth System—Experience More—Architecture & Technology Overview"; Jun. 30, 2010; pp. 1-97.

Texas Instruments; "2.4-GHz Bluetooth low energy System-on-Chip"; Datasheet CC2540F128, CC2540F256; Oct. 2010; whole document (33 pages).

"Electronic Product Code (EPC)"; Wikipedia; http://en.wikipedia.org/wiki/Electronic_Product_Code; Sep. 18, 2012; whole document (3 pages).

S. Sesay et al.; "A Survey on Mobile Ad Hoc Wireless Network"; Information Technology Journal 3(2); 2004; pp. 168-175; Asian Network for Scientific Information.

* cited by examiner

WIRELESSLY TRANSFERRING DATA TO A PACKAGED ELECTRONIC DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED [APPLICATION] *APPLICATIONS*

[This application claims priority of U.S. Provisional Patent Application Ser. No. 61/553,599, filed on Oct. 31, 2011, the entire contents of which are incorporated herein by reference.] *This is a reissue patent application of U.S. Pat. No. 9,369,959, application Ser. No. 13/486,460 filed Jun. 1, 2012, which claims priority from U.S. provisional application No. 61/553,599, filed on Oct. 31, 2011, all of which are hereby incorporated by reference in their entireties.*

TECHNICAL FIELD

The exemplary and non-limiting embodiments of this invention relate generally to wireless communication systems, methods, devices and computer programs and, more specifically, relate to wireless flashing of electronic devices and to wireless transfer of software and content to the device even prior to retail sale of the device while it is still packaged.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Typically, after a new or existing electronic device enters the market various changes to the firmware of those devices may be required (e.g. fixing bugs or adding features to the device). Similarly, enhancements in software residing on the device may become available or new software may need to be deployed on the device. Currently, electronic device manufacturer's ability to provide expedient and secure firmware and/or software and/or pre-installed content updates to electronic devices in the supply chain is limited. The traditional method of accessing memory after an electronic device is inserted into sale packaging is to remove the device from the packaging, connect cables to the device and enter various commands to an attached PC to direct flashing of the device's memory or to install new software. This process becomes expensive, time consuming and complicated after the electronic device has been inserted into sale packaging and becomes stored in bulk (e.g. stored in multiple boxes on multiple pallets). An alternative method of accessing the memory of a device after it is inserted into sale packaging involves so-called active packaging. Active packaging is traditional sale packing which includes electronic circuitry disposed on the box or plastic wrapping (and internally connected to the electronic device) as well as wireless communication components to avoid unpacking the device after it ships from the factory. This method is expensive, cumbersome (e.g. some embodiments actually require specialized shelving to provide power to each electronic device) and adds additional complexity to the supply chain (e.g. packaging needs to be separately inventoried, tracked, and returned/recycled after sale of device). Other methods involve employing active RF-ID devices which activate electronic devices by power transmitted by an interrogator. These methods are impractical for flashing due to their poor power retention/conservation problems. Moreover, none of the traditional methods provide for high speed wireless firmware/software updates.

SUMMARY

The foregoing and other problems are overcome, and other advantages are realized, in accordance with the exemplary embodiments of these teachings.

In accordance with one aspect of the invention, a method is provided comprising: in response to wirelessly receiving a trigger signal at first circuitry of an electronic device, powering up at least second circuitry of the electronic device; and wirelessly receiving a second signal at the powered up second circuitry. In this case the second signal is according to a radio access technology for which the trigger signal is incompatible.

In accordance with another aspect of the invention, an apparatus is provided including a processor and a memory including computer program code. The memory and computer program code are configured with the processor to cause the apparatus at least to perform: in response to wirelessly receiving a trigger signal at first circuitry of the apparatus, powering up at least second circuitry of the apparatus; and wirelessly receiving a second signal at the powered up second circuitry. In this case also the second signal is according to a radio access technology for which the trigger signal is incompatible.

In accordance with another aspect of the invention, a non-transitory computer-readable memory storing software program instructions, which when executed by at least one data processor results in performance of operations that comprise: in response to wirelessly receiving a trigger signal at first circuitry of an electronic device, powering up at least second circuitry of the electronic device; and wirelessly receiving a second signal at the powered up second circuitry. Again in this aspect the second signal is according to a radio access technology for which the trigger signal is incompatible.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

Figure 1:
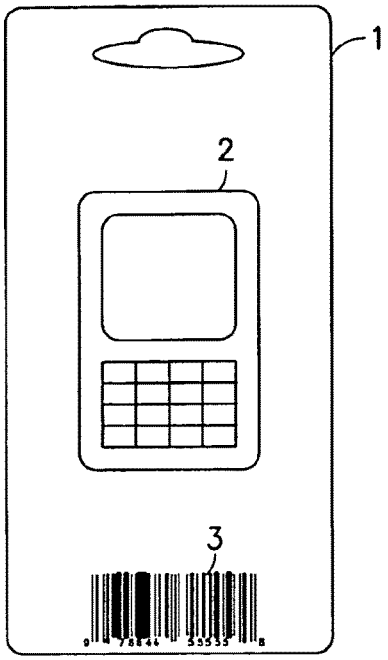
FIG. 1 is an illustration of an electronic device contained within sale packaging according to one exemplary embodiment of these teachings.

Based on the foregoing it should be apparent that the exemplary embodiments of this invention provides a method, apparatus and computer program(s) to wirelessly flash electronic devices as well as wirelessly transfer software and content to the device which minimizes power consumption and provides expedited wireless data transfer to the device.

Wireless flashing (or "wireless flashing event") (or "wireless flashing trigger") refers to an interaction between one or more electronic devices which includes the following non-limiting options according to one or more exemplary embodiments of the present invention: (1) data transfer and installation of software or firmware updates; (2) data transfer only; (3) installation of software or firmware updates only; (4) data removal; (5) configuration changes; and (6) remote booting. Each of the above wireless flashing options can be employed based upon the hardware, memory or power limitations of the electronic devices involved in a flashing event. For example, the data transfer only option is employed when the battery power of the electronic device is limited or the data to be transferred is media (e.g. ring tones or other content). Else, if the battery power of the electronic device is not limited and the data to be transferred is software or firmware updates, the first option is employed. Alternatively, if the software is already in device memory, wireless flashing would trigger the installation of the software or firmware updates. Also, as will be explained below, one or more exemplary embodiments of these teachings allow wireless access to an electronic device while in sales packaging. Accordingly, data removal may be employed at latter stages of supply chain operations to free up device memory. Moreover, a flashing event can be employed to change configuration settings to allow the electronic device to advertise its location while in a warehouse (then subsequently reconfigured to turn off advertising in transit to retail stores). Also, in retail operations the sales clerk can wireless flash (remote boot) the device to turn it on prior to the consumer opening the sale packing.

Other flashing events can include wirelessly querying (or instructing) one or more electronic devices to provide information. For example, electronic devices can be queried to provide its specific identity information (e.g. international mobile equipment identity/IMEI or medium access control/MAC address or other identifier), which in turn will allow a manufacturing, warehouse, transport, or retail facility to wirelessly inventory electronic devices without opening sales boxes or removing those from pallets. Certain authorities (e.g. customs officials) could also be provided with master keys to wirelessly flash electronic devices at ports of entry. In response to a wireless flashing event, the device could be prompted to provide an electronic identifier (ID) which would reveal the country of origin of the device so that counterfeit goods can be identified. Another example of a querying flashing event could include a request to provide information about the energy level of a device's portable power source such as the battery. In this example of a querying flashing event, a device could be instructed to provide information on its location which could be determined using a global positioning system (GPS), Galileo, or some other positioning system (including also indoor positioning systems).

As mentioned above, the present invention in some exemplary embodiments allows wireless access to the memory of at least one or more electronic devices throughout supply chain operations. Supply chain operations as used throughout this disclosure is defined as the planning and management of all activities involved in sourcing and procurement, conversion, and all logistics management activities related to the introduction of an electronic device into the market and interaction with consumers post-sale. There are at least five stages of operation up and down stream in supply chain operations in which the present invention can be employed: factory operations, distribution operations, retail operations, consumer operations and aftercare operations.

There are numerous advantages of the exemplary embodiments allowing wireless access to the memory of electronic devices throughout supply chain operations. For example, in the factory, according to one exemplary embodiment, the ability according to these teachings to wirelessly flash an electronic device allows newly assembled electronic devices to advance to a packaging/shipping stage more quickly (e.g. inserting the final electronic device into sale packaging and palletizing in bulk). In other words, electronic device manufacturers get their product to market faster as they do not need to wait to receive a finalized firmware or software to leave the factory floor and enter the warehouse. Instead, firmware and/or software updates can take place in a warehouse or during distribution as described below according to a method, and/or result of execution of computer program instructions, in accordance with the exemplary embodiments of these teachings. Moreover, embodiments of these teachings eliminate the need to unpack each device from their final shipping and retail sale packaging when a mistake is found in the electronic device's software or when it is desired to update the software to include a new feature. Hence, there is no need to physically touch the electronic devices after they are inserted into their retail sale packaging (e.g. flash each individual device's memory or install software updates).

Another example of an exemplary embodiment allowing wireless access to the memory of electronic devices in supply chain operations is during retail operations. For example, a retail sales clerk can not only remotely flash the memory to provide firmware updates but can also install personalized software based upon their interaction with the purchasing consumer.

Yet another example of an exemplary embodiment allowing wireless access to the memory of electronic devices in supply chain operations is in so-called consumer operations. After the consumer purchases the electronic device they can sideload the device and provide software updates through their own personal computer and a WLAN. Similarly, in aftercare operations, service departments affiliated with the electronic device manufacturer can provide software updates.

A description of the apparatuses which may be used to embody these teachings shall now be provided with the above described supply chain operation as one possible implementation. A detailed description of the operation of method and computer program shall follow the description of the apparatus.

Referring now to FIG. 1, sale packing 1 is shown containing an electronic device 2 and a bar code tag 3 adhered to the packaging. In retail operations, at the point of sale a clerk seeking to update the firmware and/or software first exposes the bar code tag 103 to a barcode reader (not shown) which is connected to a computer and/or a computer network (not shown). The bar code tag 3 may be of various code tag types known in the industry such as linear or one dimensional code or some two-dimensional code. Alternatively, instead of a barcode tag (and reader), an alternative embodiment could include various types of radio frequency ID (RFID) tags and readers (e.g. Electronic Product Code EPC, Near Field Communication NFC, FeliCa or the like). Yet another embodiment discussed below could omit the bar code tag (and reader) and would involve an automated wireless inventory method employing a wireless flashing query event. Additionally, the clerk may wish to install software or provide additional content to the electronic device (e.g. ring tones).

Figure 2:
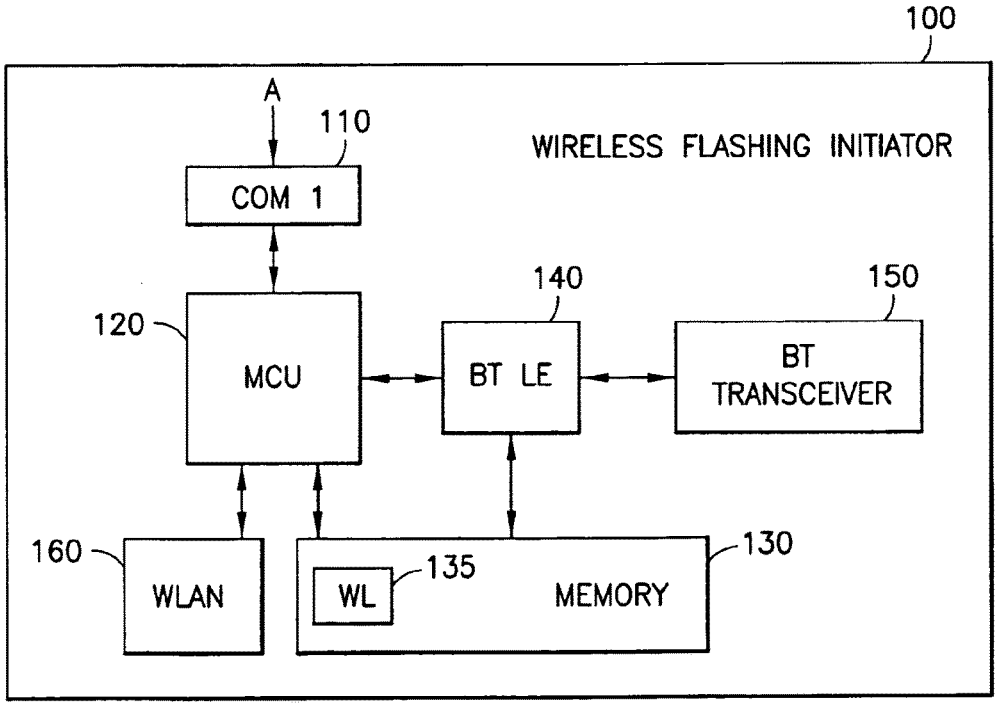
FIG. 2 is a schematic diagram of a wireless flashing initiator configured to flash at least one or more electronic devices and to direct firmware/software/content updates of those devices, according to one exemplary embodiment of these teachings.

Referring now to FIG. 2, a schematic of a wireless flashing initiator (WFI) 100 configured to flash at least one or more electronic devices and to direct firmware/software/content updates of those devices is shown according to one exemplary embodiment of the present invention. The WFI 100 can either be embodied as a standalone device or embodied in software on a personal computer or embodied in a mobile device or an application remotely accessed on an over the air (OTA) server. For example in one exemplary embodiment, the barcode reader is connected to a communication port 110 of a microcontroller 120 on a standalone device or a personal computer. The microcontroller can alternatively be a digital signal processor (DSP) or field programmable gate array (FPGA). The microcontroller 120 derives the electronic device's IMEI and MAC address by accessing memory 130 contained within the wireless flashing initiator 100. Memory 130 contains a list of known accessible Bluetooth low energy (BT LE) devices in a so-called white list 135 as well as their corresponding barcode number (not shown). Alternatively, the microcontroller 120 can access a communication network by way of a broadband radio, such as via a wireless local area network (WLAN) using a WLAN component 160 to remotely access an over the air server containing the above described data hosted by the electronic device manufacturer. Other non-limiting alternative ways of accessing a communication network can be by WCDMA, LTE, LTE-A, WiGig, UWB/60 GHz, UTRAN, GSM, BT LAN, or near-me area network (NAN) (e.g. employing close proximity communication technologies such as high data-rate extensions of NFC or RFID etc.).

Once the electronic device's IMEI and MAC address is derived, the microcontroller, for example, accesses a very low power radio, such as a system on chip (SoC) BT LE 140 compliant with Part B of the Bluetooth Specification Version 4.0 ("BT LE Link Layer Specification") Jun. 30, 2010. Alternatively, BT LE SoC can be replaced by a very low power radio providing similar functionality to BT LE. The operation of the BT LE 240 shall be clarified in detail in the description below of the operation of the method and computer program(s) to wirelessly flash electronic devices, as well as wirelessly transfer software and content to the electronic device. The BT LE 140 transitions its state within its Link Layer by entering into an advertising state (by accessing a Bluetooth transceiver 150 or at least a BT receiver) and sends out one or more advertising packet data units specific to the electronic device's IMEI and MAC address.

Figure 3:
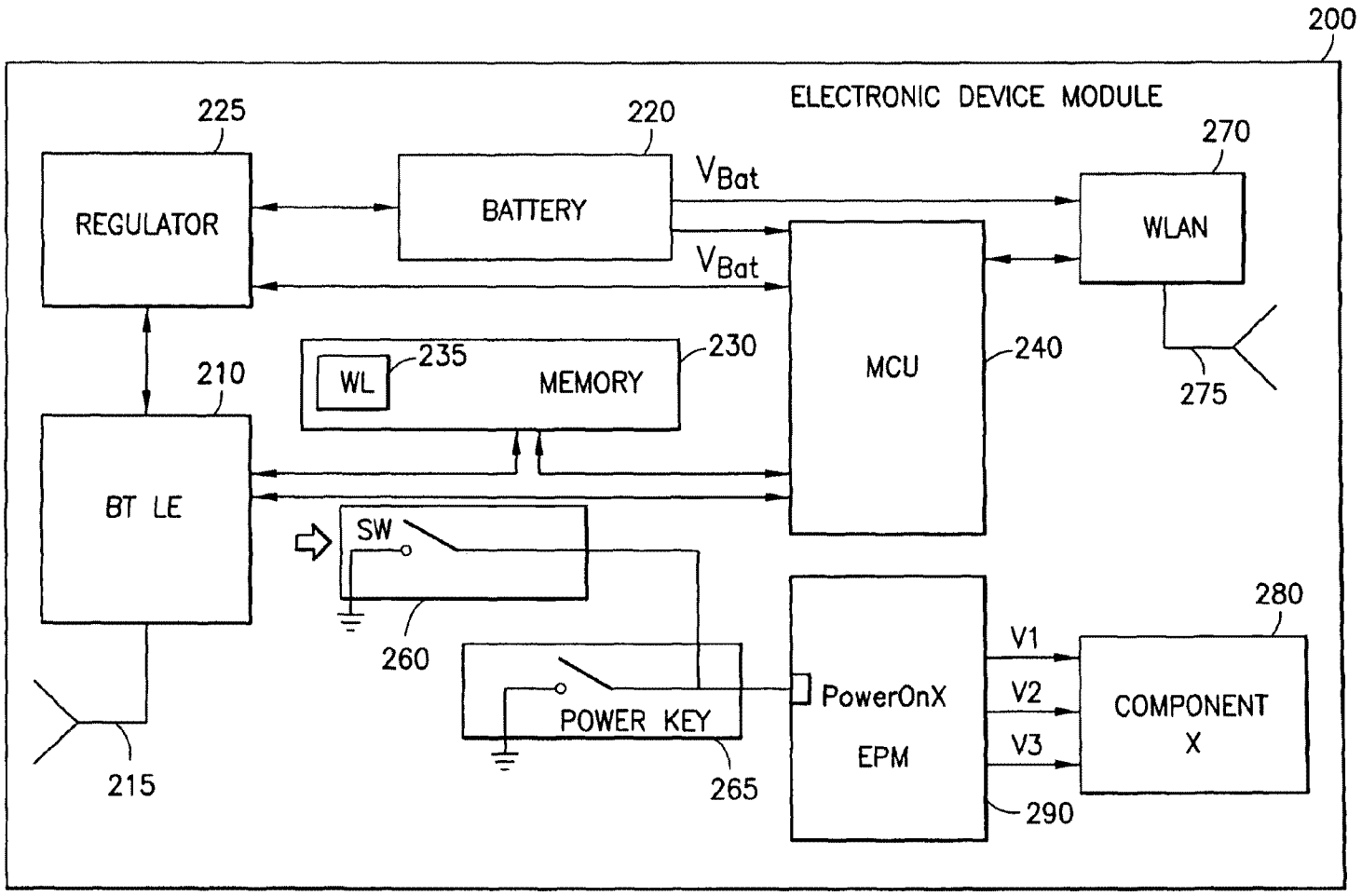
FIG. 3 is a schematic block diagram of an electronic device configured to include BT LE functionality, a regulator, and switch to receive a wireless flashing event and a WLAN to receive firmware/software updates, in accordance with the exemplary embodiments of these teachings.

Referring now to FIG. 3, electronic device 2 can in one exemplary embodiment contain an electronic device module (EDM) 200 which has previously been configured to receive the advertising packet data unit due to the fact that the link layer of the BT LE 210 has been transitioned into a scanning state prior to being placed into the sale packaging 1. As shown in FIG. 3, BT LE 210 is coupled to a Bluetooth transceiver 215. BT LE 210 can be a BT LE SoC or a very low power radio providing similar functionality to BT LE. Upon receiving the advertising packet data broadcast by the wireless flashing initiator 100, the EDM BT LE 210 checks its own white list 235 contained within memory 230 to determine if access is appropriate. After finding a white list record containing the wireless flashing initiator entry, the wireless flashing initiator 100 and EDM 200 Link Layers transition into a connection state with the electronic device 200 assuming the master role and the wireless flashing initiator assuming the slave role. In an alternative embodiment of the present invention the roles of master and slave can be reversed. In particular, the wireless flashing initiator 100 can assume the master role and the EDM 200 can assume the slave role whereas the EDM is in the advertising state and the wireless flashing initiator is in the scanning state.

As shown in FIG. 3, the electronic device module 200 includes an energy and power management (EPM) chip 290 which provides electrical power to component X 280. Component X 280 represents any hardware (HW) component of the electronic device module 200 including but not limited to for example MCU 240 and WLAN 270. The EPM 290 could control power provided to the MCU 240 or WLAN 270. The EPM 290 is shown as a separate chip. However, it may be integrated as a part of MCU 240 or some other component in device 200. The EPM 290 may also be distributed so that it is partially its own circuitry and partially integrated to other components such as MCU 240. EPM chip 290 may provide the direct battery voltage $V_{bat}$ coming from battery 220, or it may modify that voltage using regulators that are changing the voltage, current and/or other characteristics of electric current.

EPM chip 290 may also simply switch on and off the electrical power to other components and/or itself. The voltages $V_1$, $V_2$ and $V_3$ in the FIG. 3 indicate that various components 280 may use different voltages to power themselves. Typical examples of regulators in the prior art are boost regulators that increase the voltage and buck regulators that drop the voltage. EPM chip 290 may have an input (shown as PowerOnX in FIG. 3) that activates its operation during the booting of device module 200. There are several ways and means to accomplish the booting as is known from the prior art. For example, the EPM chip 290 may start the powering up sequence when the input PowerOnX is connected to electrical ground via a power key 265. This is shown in FIG. 3. Alternatively the sequence may be started by connecting PowerOnX to some certain voltage, such as battery voltage $V_{bat}$, or use any other kind of electrical signal. EPM chip 290 may be programmable so that it is able to boot the device 200 in various ways (e.g. programmable by using the wireless flashing initiator 100). For example, depending on the conditions, it may provide electrical power only to some certain components of the device 200 or to all of them.

It is desirable to ensure that the electronic device module 200 has enough battery energy for the whole duration of the flashing. The EDM BT LE 210 determines the state of charge of the internal battery 220 of the electronic device module 200. It does this by communicating with a regulator 225 coupled to both the battery 220 and the microcontroller 240. An alternative embodiment shown in FIG. 8 discloses an EDM 800 which includes a power management (PM) chip 810 instead of a regulator to provide a wireless flashing event. Alternatively, regulator 225 (as shown in FIG. 3) and/or power management chip 810 can interact with EPM chip 890 to make a determination of the power constraints of the device. If the battery is below a predetermined threshold level of charge the flashing and firmware/software update attempt can be aborted. The determination to abort can be controlled by the EDM 200 or the wireless flashing initiator 100. The threshold level can vary between devices and generally represents a value of charge at which reliable flashing can occur.

Once it is determined that the EDM 200 has sufficient power to allow the device to wake up and receive a firmware and/or software update or content, the BT LE 210 turns on the device. As used throughout this disclosure the turning on of the electronic device refers to emulating the user interface for powering up the device. Such a user interface may include for example, a gesture, a combination of keys pressed, detection of voltage in the charging connector or battery interface. One possible embodiment involves emulating the pressing of a power button or by powering up selected components (e.g. MCU 240, WLAN 270 or Component X 280). In one exemplary embodiment of these teachings the BT LE 210 powers on the microcontroller 240 to determine the firmware/software version contained in the memory 230 of the EDM 200 and compares that information with a database maintained by the electronic device manufacturer. If the EDM 200 is in need of a firmware or software update a request for information is received from the wireless flashing initiator BT LE 140 regarding the EDM WLAN capabilities.

If the EDM 200 has a WLAN component 270 and suitable transceiver 275 then the wireless flashing initiator BT LE 140 sends relevant settings data to the EDM 200 such as the name of a secure communication network, the service set identifier (SSID) of the access point, security settings, security keys and key indexes. Alternatively, EDM 200 could be equipped with a broadband radio configured to allow access to any of the following non-limiting examples of communication networks, WCDMA, LTE, LTE-A, WiGig, UWB/60 GHz, UTRAN, GSM, BT LAN, near-me area network (NAN) (e.g. employing close proximity communication technologies such as high data-rate extension of NFC or RFID etc.) or any other network capable of supporting file transfer at the needed bit rate. Additional information can be sent to the EDM 200 to allow access to the electronic device manufacturer's server or an affiliated party to provide firmware and/or software updated via a predetermined WLAN. Such information may include the name of an over the air server, server port, address, username and password to authenticate to that server. After the software update is completed the BT LE 210 powers down the EDM 200 and the white list 235 can be erased, modified or updated. Alternatively, the MCU 240 can power down the EDM 200.

Figure 4:
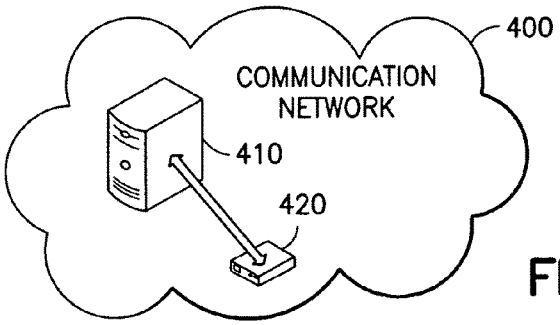
FIG. 4 is a cloud diagram illustrating a communication network, in accordance with the exemplary embodiments of these teachings.

Referring now to FIG. 4, a cloud diagram illustrating a communication network, in accordance with the exemplary embodiments of this invention is shown. The communication network 400 can be, as a non-limiting examples, a WLAN, WCDMA, LTE, LTE-A, WiGig, UWB/60 GHz, UTRAN, GSM, BT LAN, near-me area network (NAN) (e.g. employing close proximity communication technologies such as high data-rate extension of NFC or RFID etc.) or any other network capable of supporting file transfer at the needed bit rates. Server 410 can be an over the air server maintained by the electronic device manufacturer or an affiliated party authorized to provide firmware or software updates, and can be accessible to at least one of the above described communication networks via an access point 420. An alternative embodiment could integrate physically the WFI and access point 420 into the same device (not shown).

Figure 5:
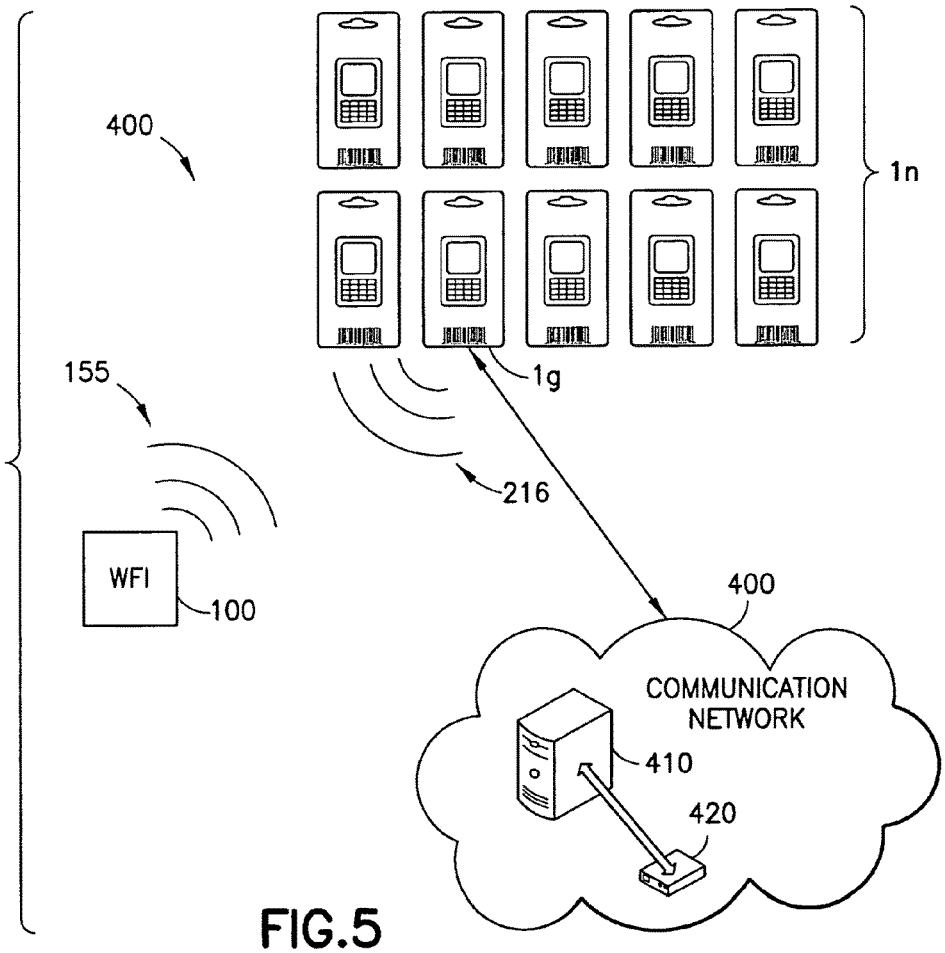
FIG. 5 is an illustration of a system, method and a result of execution of computer program instructions for transmitting a wireless flashing event to at least one or more electronic devices and to direct the transfer of firmware/software/content updates on at least one or more devices, in accordance with the exemplary embodiments of these teachings.

In FIG. 5 a system, method and a result of execution of computer program instructions for transmitting a wireless flashing event to at least one or more electronic devices and to direct the transfer of firmware/software update on at least one or more devices is illustrated, in accordance with the exemplary embodiments of this invention. As shown in that system, a wireless flashing initiator 100 sends out a flashing event 155 directed at one or more electronic devices contained within sale packing 1n and targeted at a specific target electronic device 1g. The one or more electronic devices 1n could be in a retail store on display or in boxes on pallets in a delivery truck en route to the store or in a warehouse. After target electronic device 1g receives an advertisement packet data from the wireless flashing initiator 100, it checks its white list 235 for a white list record containing wireless flashing initiator 100 information and sends a response 216 to achieve a transition of both BT LE Link Layers of the wireless flashing initiator 100 and target electronic device 1g to a connection state. Thereafter, as will be described shortly a method and execution of computer program instructions operate to cause the flashing of the target electronic device 1g (wake up) and to direct the transfer of a software/firmware update via communication network 400. An alternative embodiment could omit communication network 400 and instead utilize WiFi/WLAN directly. As such the function of computer 610 and access point 420 would be integrated.

Figure 6:
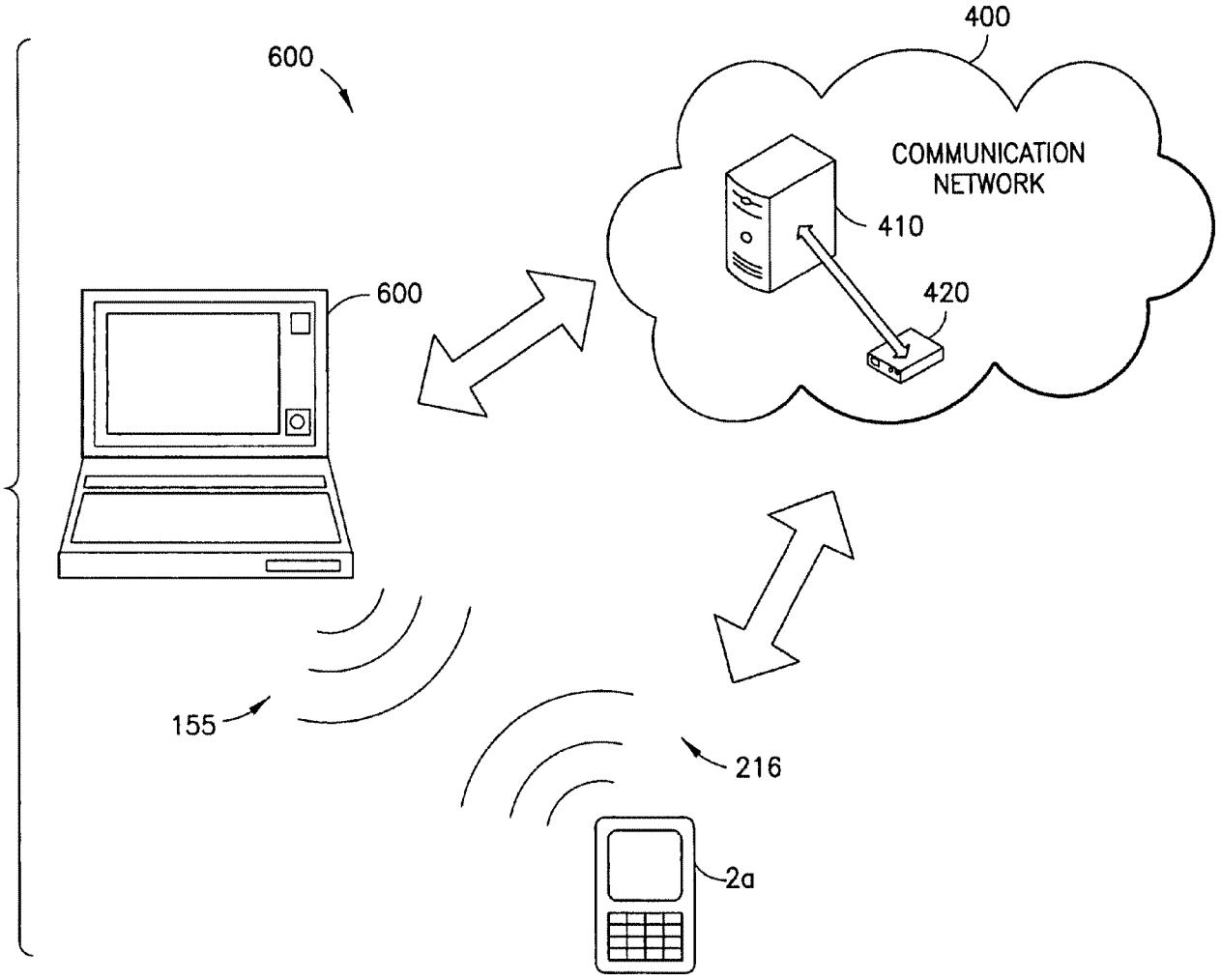
FIG. 6 is an illustration of a system, method and a result of execution of computer program instructions for sideloading an electronic device to direct the transfer of firmware/software/content updates to the device, in accordance with the exemplary embodiments of these teachings.

Referring now to FIG. 6, a system, method and a result of execution of computer program instructions for sideloading an electronic device to direct the transfer of software/firmware update or content to the device 600 is shown, in accordance with the exemplary embodiments of this invention. The source of the direct transfer can be a personal computer or similar device with sufficient data storage and radio resources with access to a hard drive resident on the PC, a CD/DVD, detachable storage (USB key, SD, MMC or similar storage devices) or an over the air server. In FIG. 6, a personal computer 610 acts as an initiator and is utilized by a consumer to send out a flashing event 155 to their purchased electronic device 2a. Alternatively, sideloading can be utilized by an individual representing a manufacturer, an operator, a carrier, logistical support personnel, distributors, transportation specialists or retailers. The purchased electronic device 2a responds by checking its white list for a white list record containing personal computer 610 information and sends a response 216 to achieve a transition of both BT LE Link Layers to a connection state. Thereafter, as will be described shortly, a method and execution of computer program instructions operate to cause the flashing of the target electronic device 2a (wake up) and to direct the transfer of software/firmware update via communication network 400.

A method and execution of computer program instructions which operates to cause the flashing of (at least) one or more electronic devices and to direct the transfer of firmware/software update to those devices 700 is described below with reference to FIG. 7. In at least one exemplary embodiment of the present invention, the EDM 200 includes a system on chip (SoC) identified as BT LE 210 which can be configured in compliance with, for example, Part B of the Bluetooth Specification Version 4.0 ("BT LE Link Layer Specification") Jun. 30, 2010. That particular specification describes the Bluetooth (BT) low energy (LE) Link Layer required in the core system packet. For clarification of the method and execution of computer program instructions, the Link Layer of BT LE will be briefly described below.

In BT LE, the operation of the Link Layer is described in terms of a state machine representing a BT LE compliant device ("device") operation. A device can operate in one of five (5) states: Standby State, Advertising State, Scanning State, Initiating State, and Connection State. The Link Layer state machine allows only one state to be active at a time. Also, the Link Layer is required to have at least one Link Layer state machine that supports an Advertising State or Scanning State. However, the Link Layer may have multiple instances of the Link Layer state machine.

In Standby State a device does not transmit or receive any packets and can be entered from any other state. This is the default state in BT LE Link Layer.

In the Advertising State, the Link Layer transmits advertising channel packets, protocol data units (PDUs) (e.g. messages) and possibly listens to and respond to responses triggered by these advertising channel packets. A device in the Advertising State is known as an "advertiser." For example, in FIG. 2, the BT LE 140 is in an advertising state and causes the wireless flashing initiator 100 to act as an advertiser in FIG. 5 by transmitting a flashing event 155. The Advertising State can be entered from the Standby State. A Bluetooth low energy device acting as an advertiser broadcasts advertising packets during advertising events on advertising channels. An advertising event is a series of between one and three advertising PDUs on different advertising channels sent by an advertiser. For clarity in the presentation of one particular exemplary embodiment of the present invention the advertising event can be referred to by its function "flashing event."

In Scanning State, a device listens for advertising channel packets from devices that are advertising. A device in the Scanning State is known as a "scanner." The BT LE 210 of the electronic device module 200 Link Layer shown in FIG. 3 is initially in a scanning state and target electronic device 1g acting as a scanner in FIG. 5. The Scanning State can be entered from the Standby State.

In the Initiating State a device listens for advertising channel packets from a specific device(s) and responding to these packets to initiate a connection with another device. A device in the Initiating State is known as an "initiator." The target electronic device 1g Link Layer transitions the device into the initiating state as shown in FIG. 5. The Initiating State can be entered from the Standby State.

The Connection State can be entered either from the Initiating State or the Advertising State. In FIG. 5, the wireless flashing initiator 200 Link Layer enters the connection state from an advertising state and the target electronic device 1g Link Layer transitions from the initiating state. Device in the Connection State are known as being in a "connection". Thereafter, within the Connection State, two roles are defined; the Master Role and the Slave Role. In FIG. 5, the wireless flashing initiator 100 is the slave and the target electronic device 1g is in the role of master.

Each advertising event mentioned above is composed of one or more advertising channel packets sent on each advertising channel indexes. The advertising event is discontinued (closed) after one advertising channel packet has been sent on each of the three used advertising channel indexes of the advertiser. A device may close an advertising event earlier to accommodate other functionality. For example, in one possible embodiment, the flashing event may close due to dissipation of the electronic device module 200 internal battery (e.g. below an acceptable threshold).

An advertising event can be one of following four (4) types: a connectable undirected event; a connectable directed event; a non-connectable undirected event; or a scannable undirected event. Each of the above advertising event types uses a corresponding advertising channel packet data unit. The first packet data unit of each advertising event transmits in the used advertising channel with the lowest advertising channel index.

The advertising event type determines the allowable response packet data units (PDUs). Table 1.1 below specifies the allowable response for each advertising event.

TABLE 1.1

Advertising Event Types, PDUs used and allowable response PDUs.

| Advertising Event Type | PDU used in this advertising event type | Allowable response PDUs for advertising event | |
|---|---|---|---|
| | | SCAN_REQ | CON-NECT_REQ |
| Connectable Undirected Event | ADV_IND | YES | YES |
| Connectable Directed Event | ADV_DIRECT_IND | NO | YES |
| Non-Connectable Undirected Event | ADV_NON-CONN_IND | NO | NO |
| Scannable Undirected Event | ADV_SCAN_IND | YES | NO |

In addition to the allowable response PDUs to advertising event types events set forth in Table 1.1, the Link Layer Specification also requires the following: If the advertiser receives a PDU for the advertising event that is not explicitly allowed it shall be ignored. If no PDU is received or the received PDU was ignored, the advertiser shall either send an advertising PDU on the next used advertising channel index or close the advertising event.

Advertising events use three predefined advertising channels. Moreover, advertising channel indexes are either used or unused. According to one exemplary embodiment of the present invention, the Link Layer of each BT LE device can use the advertising channel indexes as specified by the Host and the advertising channel indexes take effect when the advertising state is entered.

For all undirected advertising events, the time between the start of two consecutive advertising events (T_advEvent) is computed as follows for each advertising event:

$$T_advEvent = advInterval + advDelay \quad \text{(Equation No. 1)}$$

where advInterval is an integer multiple of 0.625 ms in the range of 20 ms to 10.24 s. advDelay is a pseudo-random value with a range of 0 ms to 10 ms generated by the link layer for each advertising event. The link layer also requires that if the advertising event type is either a scannable undirected event type or a non-connectable undirected event type, the advInterval is not less than 100 ms. On the other hand, if the advertising event type is connectable undirected event type, the advInterval can be 20 ms or greater.

As mentioned above, each electronic device contains a white list which is a list of BT LE devices allowed to access one another. Each white list entry can be referred to as a "white list record" used for link layer device filtering and which contains both the device address and the device address type (public or random). On reset, a device's white list can be deleted for security reasons. The white list is configured by the Host and is used by the Link Layer to filter advertisers, scanner or initiators. In other words, this allows the Host to configure the Link Layer to act on a request without awakening the Host.

In the advertising state, the advertising filtering policy determines how the advertiser's device Link Layer processes scan and/or connection requests. When the device is using connectable directed advertising the advertising filter policy is ignored, otherwise the Link Layer use one of the following four (4) advertising filter policy modes which are configured by the Host:

(1) Link Layer of a device processes scan and connection requests only from devices in the White List;
(2) Link Layer of a device processes scan and connection requests from all devices (e.g. White List not in use) (This is the default on reset);
(3) Link Layer of a device processes scan requests from all devices and only processes connection requests from devices that are in the White List; and
(4) Link Layer of a device processes connection requests from all devices and only process scan requests from devices that are in the White List.

Only one advertising filtering policy mode is supported at a time.

In the scanning state, the scanner filter policy determines how the scanner's Link Layer processes received advertising packets. A device uses one of the following two scanner filter policy modes which are configured by the Host:

(1) Link Layer of a device processes advertising packets only from devices in the White List; or
(2) Link Layer of a device processes all advertising packets (e.g. White List is not used). This default on reset.

Also, as defined by the scanner filter policy, any connectable directed advertising packet received which does not contain the scanner's device address is ignored. Moreover, only one scanner filter policy mode is supported at a time.

In the initiation state, the initiator filter policy determines how an initiator's link layer processes advertising packets. A device uses one of the following initiator filter policy modes which are configured by the Host:

(1) Link Layer of a device processes connectable advertising packets from all devices in the White List; or (2) Link Layer of a device ignores the White List and process connectable advertising packets from a specific single device specified by the Host.

Also, like in the initiation state, if a device receives a connectable directed advertising packet from an advertiser that is not contained in its White List or the single address specified by the Host, the connectable directed advertising packet is ignored. Moreover, only one initiator policy mode is supported at a time.

As mentioned above, some exemplary embodiments of the present invention employ connectable undirected event type or connection directed advertising event type. When the connectable undirected advertising event type is used, advertising indications (ADV_IND PDU) are sent by the Link Layer of the BT LE compliant device. This event type allows a device acting as a scanner or initiator to respond with either a scan request or connect request. A scanner can for example respond by sending a scan request (SCAN_REQ PDU) to request additional information about the advertiser. On the other hand, an initiator can respond by sending a connect request (CONNECT_REQ PDU) to request the Link Layer to enter the Connection State. The link layer requires that devices listen on the same advertising channel index for requests from scanners or initiators.

If the advertiser receives a SCAN_REQ PDU that contains its device address from a scanner allowed by the advertising filter policy, it replies with SCAN_RSP PDU on the same advertising channel index. After the SCAN_RSP PDU is sent, or if the advertising filter policy prohibits processing the SCAN_REQ PDU, the advertiser move to the next used advertising channel index to send another ADV_IND PDU, or close the advertising event.

If the advertiser receives a CONNECT_REQ PDU that contains its device address from an initiator allowed by the advertising filter policy, the Link Layer exits the Advertising State to transition into the Connection State in a Slave Role. If the advertising filter policy prohibited processing the received CONNECT_REQ PDU, the advertiser either moves to the next used advertising channel index to send another ADV_IND PDU, or close the advertising event.

The time between the beginning of two consecutive ADV_IND PDUs within an advertising event is less than or equal to 10 ms. The advertising state is closed within the advertising event.

Figure 13A:
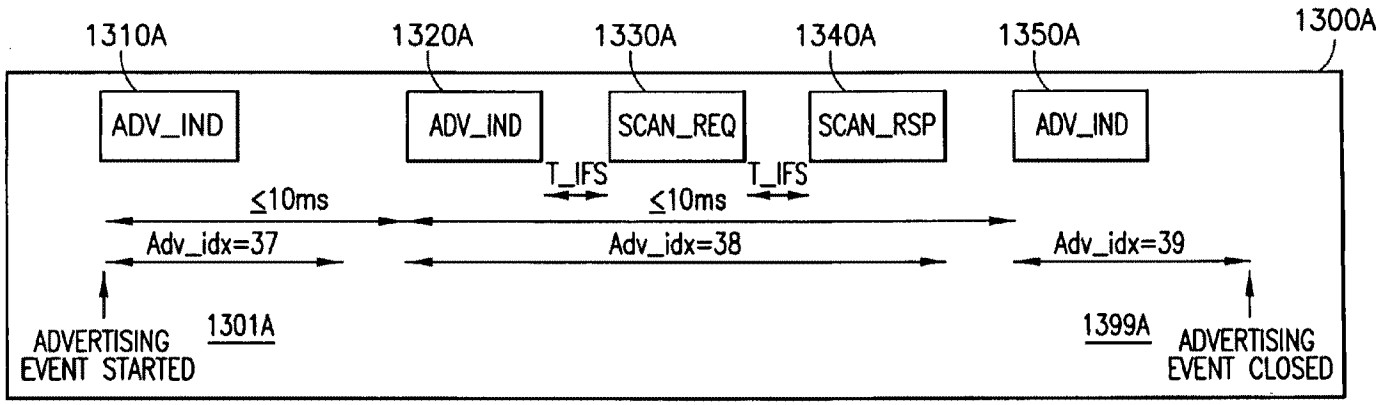
FIG.13A PRIOR ART
FIG. 13A is a timing diagram of an advertising event illustrating a connectable undirected advertising event type according to the prior art.

Referring now to FIG. 13A, an illustration of advertising events employing connectable undirected event type is shown according to the prior art. As shown in that figure, the advertising event uses all the advertising channel indexes during which a SCAN_REQ PDU is received and a SCAN_RSP PDU is sent in 1300A. The figure is reproduced from Section 4 of the BT LE Link Layer Specification which describes the Air Interface Protocol of the Link Layer Specification, Bluetooth Specification Version 4.0 Jun. 30, 2010, Volume 6, p. 61 (FIG. 4.3 in the original).

As can be seen in FIG. 13A, an advertising event is started 1301A by a first BT LE compliant device as a connectable undirected event (ADV_IND) 1301A on an unused advertising channel assigned advertising channel index (Adv_idx) 37. A second connectable undirected event (ADV_IND) 1320A is sent on Adv_idx 38 by that same device. At this point, a second BT LE compliant device responds on the same Adv_idx 38 with a scan request SCAN_REQ 1330A. The time inter frame space (T_IFS) which is the time interval between consecutive packets on same channel index is not specified here since it is not limited because the advertising interval of an connectable undirected event can be 20 ms or greater as mentioned above.

Next, the first BT LE compliant device applies its advertising filter policy which in this case allows a scan response SCAN_RSP 1340A to be sent on the same Adv_idx 38. The first BT LE compliant device moves to the next unused Adv_idx 39 and sends a third connectable undirected event (ADV_IND) 1350A. The advertising event is closed 1399A since all three Adv_idxs are used. Since the event is a connectable undirected event, the advertising interval can be 20 ms or greater as mentioned above.

When the connectable directed advertising event type is used, directed advertising indications (ADV_DIRECT_PDUs) are sent by the Link Layer of the BT LE compliant device. The connectable directed advertising event type allows an initiator to respond with a connect request. An initiator may send a connect request (CONNECT_REQ PDU) to request the Link layer to enter the Connection State. The ADV_DIRECT_IND PDU contains both the initiator's device address and the advertiser's device address. Only the addressed initiator may initiate a Link Layer with the advertiser by sending a CONNECT_REQ PDU to the advertiser.

After every ADV_DIRECT_IND PDU sent by the advertiser, the advertiser listens for CONNECT_REQ PDUs on the same advertising channel index. Any SCAN_REQ PDUs received is ignored.

If the advertiser receives a CONNECT_REQ PDU that contains its device address and the initiator device address is contained in the ADV_DIRECT_IND PDU, the Link Layer shall exit the Advertising State and transition to the Connection State in the Slave Role. Otherwise, the advertiser shall either move to the next used advertising index to send another ADV_DIRECT_IND PDU, or close the advertising event.

The time between the start of two consecutive ADV_DIRECT_IND PDUs sent on the same advertising channel index is less than or equal to 3.75 ms. Also the link layer exits the advertising state no later than 1.28 s after the advertising state was entered.

Figure 13B:
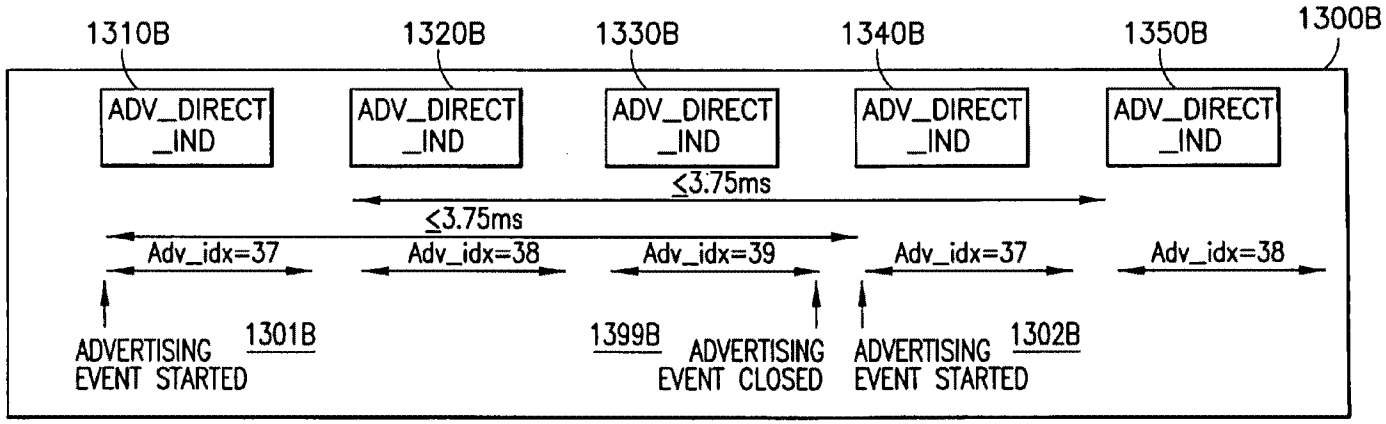
FIG.13B PRIOR ART
FIG. 13B is a timing diagram of an advertising event illustrating a connectable directed advertising event type according to the prior art.

Referring now to FIG. 13B, a connectable directed advertising event type is illustrated according to the prior art. The figure is reproduced from Section 4 of the BT LE Link Layer Specification which describes the Air Interface Protocol of the Link Layer Specification, Bluetooth Specification Version 4.0 Jun. 30, 2010, Volume 6, p. 62 (FIG. 4.6 in the original). As shown in the figure, only advertising PDUs transmitted on the available channels is illustrated 1300B. As shown in FIG. 13B, a BT LE compliant device transmits a sequence of five ADV_DIRECT_IND PDUs in two advertising events without receiving a CONNECT_REQ PDUs. The advertising event is started 1301B by introducing a first ADV_DIRECT_IND PDU 1301B on Adv_inx 37. A second ADV_DIRECT_IND PDU 1320B follows transmitted on Adv_inx 38 and then a third ADV_DIRECT_IND PDU 1320B transmitted on Adv_inx 39. Since the sequence is more than 3.75 ms the advertising event must close. 1399B. Now, the BT LE compliant device starts a second advertising event 1302B by transmitting a fourth ADV_DIRECT_IND PDU 1340B on Adv_inx 37 followed by a fifth ADV_DIRECT_IND PDU 1350B on Adv_inx 38. The specific BT LE compliant device sought has not yet responded to the advertiser. Hence, this demonstrates that connectable directed advertising is well designed for cases in which fast Link Layer connection set up is essential (e.g. reconnection) however, it is a power and bandwidth intensive advertising scheme.

When directed by a host BT LE compliant device, the BT LE compliant device acting as an initiator enters the Scanning State. In particular, when scanning, the device listens on the advertising channel indices. There are two types of scanning, determined by the Host: passive and active. When in passive scanning, the Link Layer will only receive packets; it does not send any packets. On the other hand in Active Scanning, the Link Layer shall listen for advertising PDUs and depending on the advertising PDU type it may request an advertiser to send additional information.

During scanning, the Link Layer listens on an advertising channel index for the duration of the scanning window, scanWindow. The scan interval, scanInterval, is defined as the interval between the start of two consecutive scan windows.

The Link Layer should listen for the complete scanWindow every scanInterval as directed by the Host unless there is scheduling conflict. In each scan window, the Link Layer should scan on a different advertising channel index. The Link Layer shall use the advertising channel indices.

According to the BT LE Link Layer Specification, the scanWindow and scanInterval parameters are less than or equal to 10.24 s. Moreover, the scanWindow is less than or equal to the scanInterval. If the scanWindow and the scanInterval parameters are set to the same value by the Host, the Link Layer should scan continuously. The scanner filter policy applies when receiving an advertising PDU when scanning.

According to one or more exemplary embodiment of the present invention a BT LE compliant device coupled to a remote device (e.g. the EDM 200 in FIG. 3) can significantly reduce average current consumption. For example, if the scanWindow is 20 ms and the scanInterval is 10.24 s a duty cycle is order of 0.2%.

A BT LE compliant device also generates reports. In particular, for each non-duplicate ADV_DIRECT_IND PDU received by a BT LE device which contains its link layer's device address (from an advertiser) results in an advertising report generated and sent to the Host. Also, for each non-duplicate ADV_IND, ADV_SCAN_IND, ADV_NONCONN_IND, or SCAN_RSP PDU received from advertisers, results in an advertising report generated and sent to the Host. The advertising report contains at least the advertiser's device address and advertising data or scan response data if present. Duplicate advertising reports are not required to be sent to the Host. A duplicate advertising report is an advertising report for the same device address while the Link Layer stays in the Scanning State. The advertising data may change; advertising data or scan response data is not considered significant when determining duplicate advertising reports.

Scanning can be either passive or active. When in passive scanning, the Link Layer will only receive packets; it does not send any packets. On the other hand in Active Scanning, the Link Layer listens for advertising PDUs and depending on the advertising PDU type it may request an advertiser to send additional information.

The Link Layer sends a SCAN_REQ PDU to an advertiser from which an ADV IND PDU or ADV_SCAN_IND PDU is received.

The Link Layer sends at least one SCAN_REQ PDU after entering the Scanning State to advertisers from which ADV_IND or ADV_SCAN_IND PDUs are received. The Link Layer sends further SCAN_REQ PDUs to advertisers from which ADV_IND or ADV_SCAN IND PDUs have been received. Moreover, the Link Layer is configured to interleave SCAN_RSP PDUs to multiple advertisers.

The scanner runs a backoff procedure to minimize collisions of SCAN_REQ PDUs from multiple scanners. Also, upon entering Scanning State, the upperLimit is set to one and the backoffCount shall be set to one.

Also according to the BT LE Link Layer Specification, on every received ADV_IND PDU or ADV_SCAN_IND PDU that is allowed by a scanner filter policy and every SCAN_REQ PDU sent the backoffCount decremented by one until it reaches the value of zero. The SCAN_REQ PDU shall only be sent when backoffCount becomes zero.

After sending a SCAN_REQ PDU the Link Layer listens for a SCAN_RSP PDU from that advertiser. If the SCAN_RSP PDU was not received from that advertiser, it is considered a failure otherwise it is considered a success. On every two consecutive failures, the upperLimit is doubled until it reaches the value of 256. On every two consecutive successes, the upper limit is halved until it reaches the value of one. After success or failure of receiving the SCAN_RSP PDU, the link layer sets backoffCount to a new pseudorandom integer between one and upperLimit.

Figure 7:
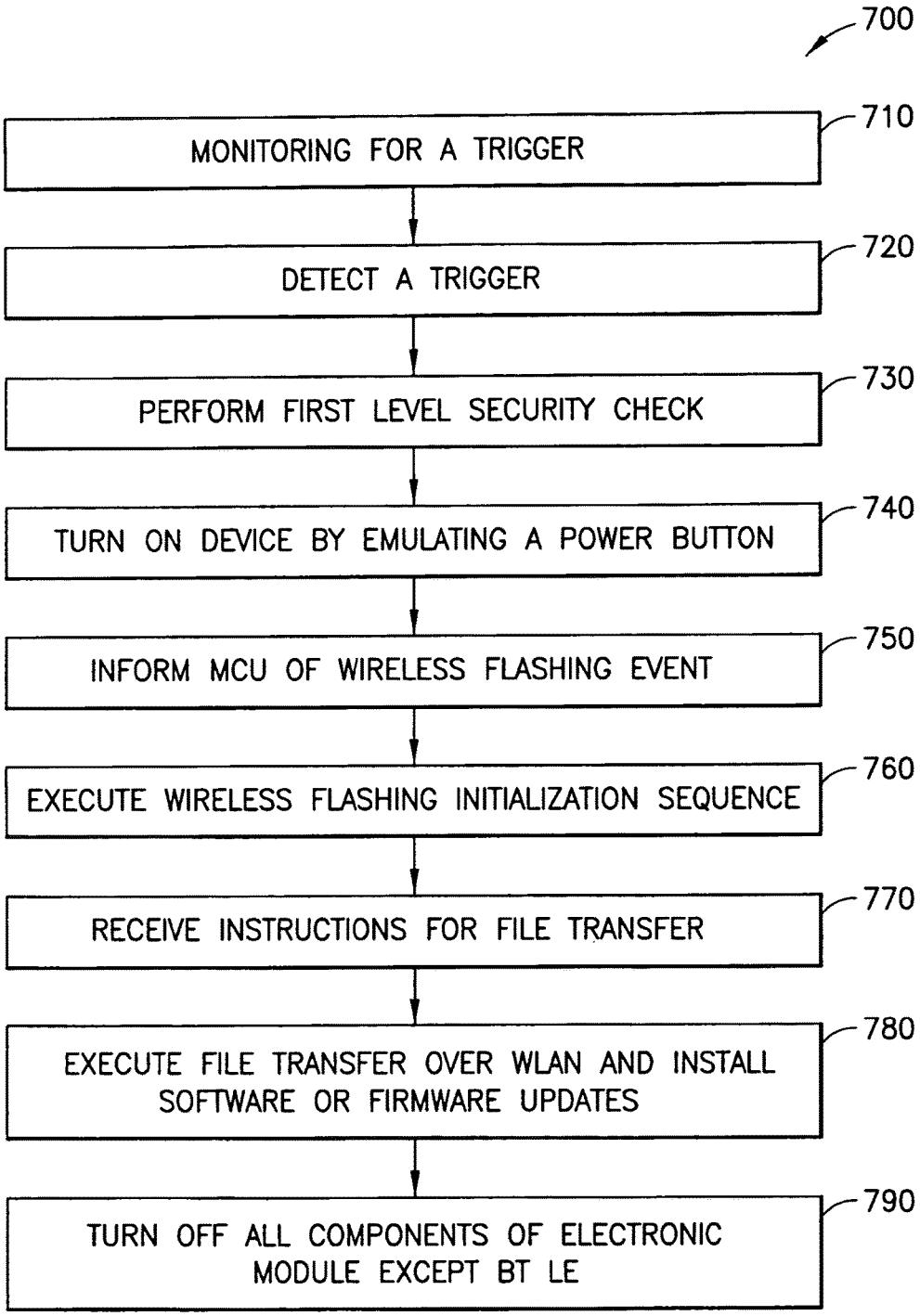
FIG. 7 is a logic flow diagram that illustrates the operation of a method, and a result of execution of computer program instructions to receive a flashing event and receive firmware and/or software and/or content updates, in accordance with the exemplary embodiments of these teachings.

Referring now to FIG. 7, a logical flow diagram 700 depicts an exemplary but non-limiting method and execution of computer program instructions which operate to cause the flashing at least one or more electronic devices and to direct the transfer of firmware/software/content updates to those devices. Initially, the electronic device module 200 is parked in a scanning state which causes low power consumption from the internal battery 220. Accordingly, the BT LE 210 is monitoring for a trigger signal 710. The WFI 200 BT LE 140 acting as an advertiser allows the EDM's BT LE 210 to detect a trigger 720 (e.g. receives advertising packet data).

In one exemplary embodiment of the present invention, the BT LE connection setup between BT LE 140 and BT LE 210 employs connectable direct advertising. The link layers of both devices are configured as follow: The ADV_DIRECT_IND PDU is 175 us with the advertising event≤3.75 ms with three ADV_DIRECT_IND PDUs sent on three different channel and a new event is started immediately after the previously one. With respect to scanning, the scanWindow is 20 ms and the scanInterval is 10.24 s.

The performance on this particular embodiment is as follows: the ADV_DIRECT PDU is found by the scanner in 4 ms (within the scanInterval of 10.24 s) (and the results have a linear distribution).

In another exemplary embodiment of these teachings, the BT LE connection setup between BT LE 140 and BT LE 210 employs connectable undirected advertising. Undirected advertisement parameters can be configured to set a MINIMUM value between two advertisement events which could be 20 ms+random delay ranging from 0 ms to 10 ms as defined by the BT LE specification described above. The link layers of both devices are configured as follows: the ADV_IND PDU is 108 us with the advertising event≥20 ms within 3.75 ms three ADV_IND PDUs are sent on three different channels and separated in time by event≤10 ms and a new event is started immediately after the previous one. With respect to scanning, the scanWindow is 20/30 ms and the scanInterval is 10.24 s.

The performance of this particular embodiment when the scanWindow is set at 20 ms results in a connection established with ~83% likelihood (within 10.24 s) and ~97% likelihood (within 20.48 s). On the other hand, the performance of this particular embodiment when the scanWindow is set at 30 ms results in a connection established with ~100% likelihood within the scanInterval of 10.24 s (an average of 5.12 s). That is, in this particular embodiment, the likelihood for successful connection setup is increased more by increasing the scanWindow from 20 ms to 30 ms rather than by doing multiple scans (monitoring window 10.24 s or 20.48 s=>scanInterval is equal to 10.24 s, and scanWindow is 20 ms).

After the devices are setup, the EDM 200 performs a first level security check 730 by checking its white list to determine if an entry exists that matches the wireless flashing initiator 100 address. Alternative embodiments of these teachings may employ additional security features or checks such as the following non-limiting examples: (1) white list only, (2) public/private key authentication methods as known in the art, or (3) white list+a public/private key authentication method. Moreover, the EDM 200 could be configured to provide no first level security at all. The determination of which security feature or check to employ (or not to employ any) will depend on the technical capabilities (e.g. radio, storage and processing capabilities) of the devices involved (e.g. electronic devices and wireless initiator). If the wireless flashing initiator 100 passes the security check then the BT LE 210 turns on the power of the electronic device module 200 for example by emulating the pressing of the power button 740. As shown in FIG. 3, and in one exemplary embodiment, the BT LE 210 utilizes a switch 260 which is essentially a tied-down resistor coupled to a pin (e.g. grounds to obtain a Power ON/Off) and Power key 265 of microcontroller 240. Depending on the microcontroller or DSP and BT LE chip found in a particular electronic device module the particular pin out to be grounded may differ.

As can be seen in FIG. 3, SW 260 is in parallel with power key 265, so that closing SW 260 emulates the closing of the power key 265. In some microcontrollers or processors a pin might be available which is responsible for energy and power management (EPM) functions. By grounding this particular pin the microcontroller or processor is caused to receive a Power On/Off request which starts the device. The same approach can be employed to power off the device as discussed below.

It should be understood that other embodiments of these teachings may involve EDM 200 equipped with an EPM chip 290 that uses other electrical signals for power up. For example, instead of the electrical ground or 0 Volts such a signal may be some positive voltage, e.g. 1.8 Volts, 3.3 Volts or 5 Volts. In addition, such an electrical signal may include time dependence, e.g. the signal may be certain time at some voltage level and/or require several different voltage levels.

The EPM chipset 290 may then proceed to power up the whole device in the normal fashion. This means that the EPM chipset initializes itself and then starts to provide suitable operating voltages to other components of the EDM 200. To illustrate an example, FIG. 3 shows three voltages, namely $V_1$, $V_2$, and $V_3$. The operating voltages are used to power up all other necessary components of the EDM 200. These components are illustrated as Component X 280 in FIG. 3. It should be understood that Component X 280 represents any hardware component(s) of the electronic device module 200 including but not limited to, for example, MCU 240 and WLAN 270.

Yet another embodiment of the present invention contains a method that involves a special flashing power up sequence. In this case the power up signal from the switch 260 causes the EPM chipset 290 to power up only selected components of the EDM 200. For example, one component in the electronic device module 200 can be a display. The special flashing power up sequence may omit the power up of the display since it is not needed for flashing EDM 200. In a similar way, for example a cellular modem may be left unpowered. This helps to save the energy in the battery 220 during the flashing process.

In one non-limiting embodiment of these teachings the special power up sequence described above is controlled by the MCU 240. In this case, the MCU may contain a modified boot code that detects the presence of a flashing event. The modified boot code defines a specific boot sequence which omits the powering up of certain components (e.g. the display microphone, keypad, camera, cellular radio or other components) thereby limiting the device power consumption and only powering up components critical to transferring software/firmware or content. In this embodiment, the MCU 240 may elect to configure the EPM chipset 290 to omit power up of some components 280, to power down some components 280 if they have already been powered up. It is also possible that MCU 240 configures some components 280 or to a power save mode without actually cutting the operating voltages. This may, for example, involve lower clock frequencies, or some internal power gating in component 280. In one exemplary embodiment, MCU 240 can detect without additional communication that the power on sequence is linked to a wireless flashing event (e.g. there is a dedicated PowerOnX pin). As shown in FIG. 3, in the case where signals received from switch 260 and power key 265 are coupled to the same PowerOnX pin.

Figure 8:
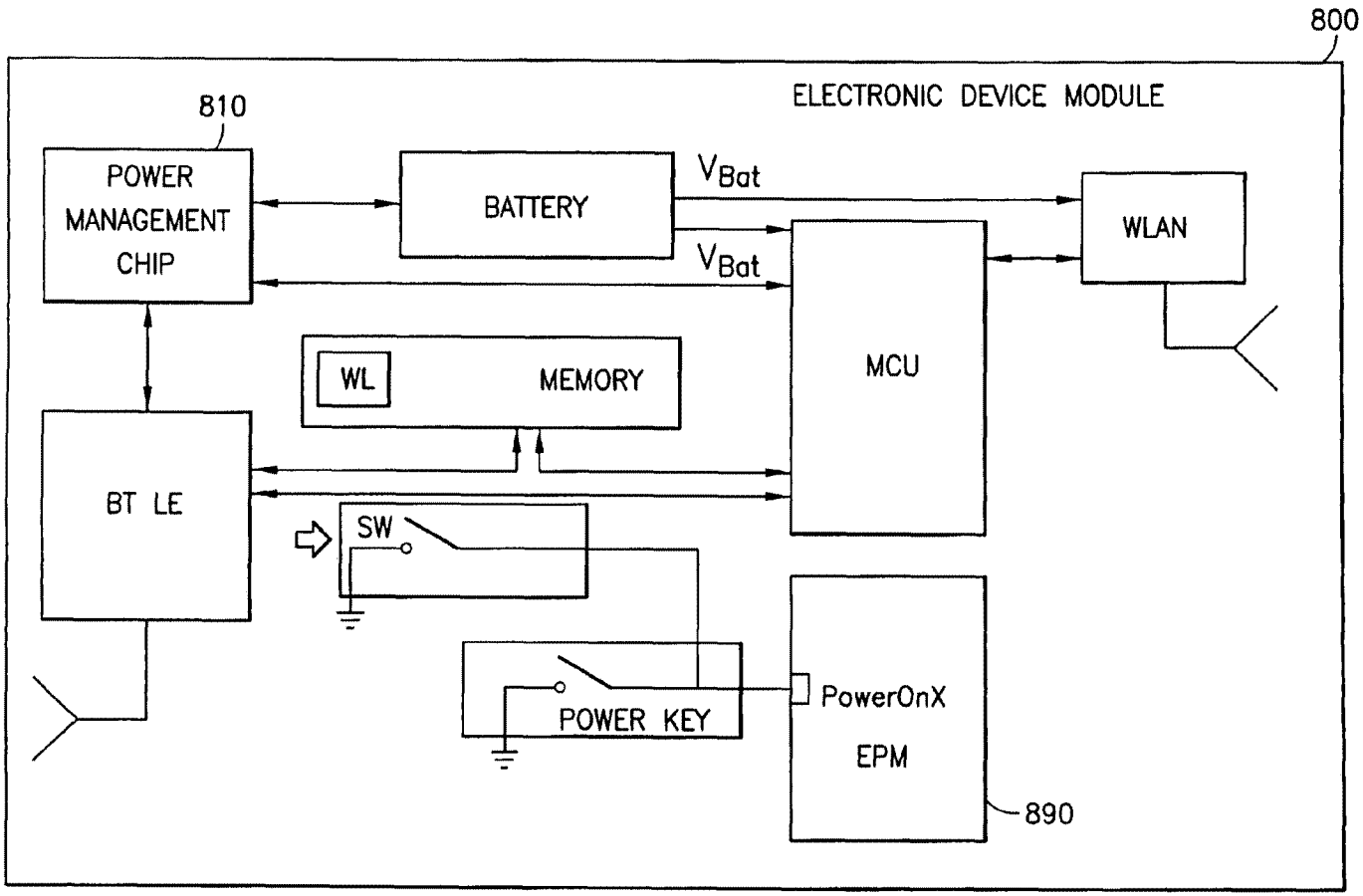
FIG. 8 is a schematic block diagram of an electronic device module configured to include a power management chip, a BT LE chip and switch to receive wireless flashing and a WLAN to receive firmware/software/content updates, in accordance with the exemplary embodiments of these teachings.

Next, the BT LE 210 informs the microcontroller 240 of an upcoming flashing event 750. In this step, the microcontroller 240, in conjunction with the regulator 225 (or alternatively a power management chip 810 as shown in FIG. 8), determine whether adequate power is available to allow the flashing event. In other words, if the internal battery 200 is depleted below a predetermined threshold level the flashing event is aborted.

If adequate power is available in internal battery 220 (or alternatively if the EDM 200 is actively under recharge via an externally sourced wireless battery recharge signal), then the microcontroller 240 executes a wireless flashing initialization sequence 760. During this step, the microcontroller performs a high level security check and provides the software version of its firmware and of its software to the wireless flashing initiator 100 BT LE 140. The high level security feature or check as used throughout this disclosure refers to possible additional security measures (and more strict security check) than the first level security feature or check discussed above (e.g. access to the EDM). The high level security feature or check prevents unauthorized parties from causing the EDM 200 to engage in data transfers over the WLAN even if they pass the first level security feature or check. Accordingly, the high level security feature or check requires that the first level of security be passed. In first level security, the wake-up of the device during the flashing event is prevented if a party is unauthorized (e.g. not in the white list or does not have key credentials). High level security prevents the CPU from turning on more resources such as turning on a broadband radio or other components.

High level security policies can include multiple access rights levels based upon the status of the parties attempting access or the type of activity which those parties seeking to engage the device. For example a high level security policy may include multiple access levels based upon the status of the party attempting access (some non-limiting examples are device manufactures, governmental or other authorities such as customs officials, sales representative or customers). Different access rights may restrict particular parties from reading certain files on the device, transferring files, installing files, removing/deleting files or re-configuring the device. With respect to sales and customer rights, the security policy might not allow some of the above operations depending upon the where in the device is in the supply chain (e.g. in a factory, warehouse or retail store). For example, in the factory and warehouse phases the EDM might not authorize rights to sales persons or customers. On the other hand, in the retail operations or maintenance phases the EDM can authorize rights to sales persons or customers. Other parties such as, governmental or other authorities such as customs officials may have security access under a high level security policy at the distribution phase.

Different data categories may also dictate a high level security policy. For example, firmware updates and installations might require higher security schemes than the transfer of advertisements (content). The reason for this distinction could be based upon the specific characteristics of the storage device(s) within the device (e.g. different memory locations). High level security policies can also control whether hardware, software or system information is released to parties, whether a broadband radio is initialized or if multiple instance of installation of software/firmware (or unassisted downing of content) is authorized.

The above described high level security policies can be a combination of conventional access rights based upon the status of the parties and/or the type of activities involved.

Some non-limiting examples of security methods or mechanisms to provide high level security can include, various public/private key exchange mechanisms known in the art, including various algorithm configured to combine IMEI codes of a particular device combined with access keys maintained in a over the air server of a manufacturer or other authorized party (e.g. Bootstrapping in GSM). Another possible security mechanism could include a pin code in the retail operations stage. Also, the EDM can be configured to permit a certain number of attempts and to time-limit attempts at authorization. In the event that a party fails to pass the authentication within a predetermined number of attempts or time, the EDM will abort the wireless flashing event.

After passing high level security, as described above, the next step can involve a determination of whether the firmware or software is in need of an update. If required, the BT LE 210 receives instructions to install additional software, the EDM 200 receives instructions for file transfer and installation of firmware or software updates 770. The instructions include set up parameters for the WLAN module 270 such as the name of a secure communication network, the SSID of the access point, security settings, security keys and key indexes. Also, instructions can include information regarding how much content can be transferred, the allowable format and storage locations in memory. In the embodiment of the present invention shown in FIG. 3 it is assumed that the EDM 200 has WLAN capabilities. It is also possible that instead of WLAN any other communication media, such as Bluetooth or Bluetooth Low Energy, can be used for providing connectivity for the flashing data. Additional information can be sent to the EDM 200 to allow access to the electronic device manufacturer's server or an affiliated party to provide firmware and/or software updated via a predetermined network. Such information may include the name of an over the air (OTA) server, server port, address, username and password to authenticate to that server.

Next, the EDM 200 can execute one of three operations: (1) a file transfer over the WLAN (2) a file transfer and installation software/firmware updates over the WLAN or (3) an installation of software/firmware updates from the device's memory (e.g. "flashing" triggers installation of certain software version) 780. After the software update is completed the BT LE 210 powers down the EDM 200 and the white list can be erased, modified or updated. Such a powering down can be accomplished by using the switch 260. Alternatively, the powering down can be made by the MCU 240. By doing so the BT LE 210 or MCU 240 turns off all components of the electronic device module except the BT LE 210 (Step 790). The BT LE 210 Link Layer transitions back to a scanner state. It should be noted that the flashing procedure and installing software/firmware updates may include several power up and power down events.

As described above an apparatus, system, method, and computer program(s) are disclosed in accordance with some of the exemplary embodiments wherein an electronic device utilizes its own battery to initiate a flashing event.

Figure 9:
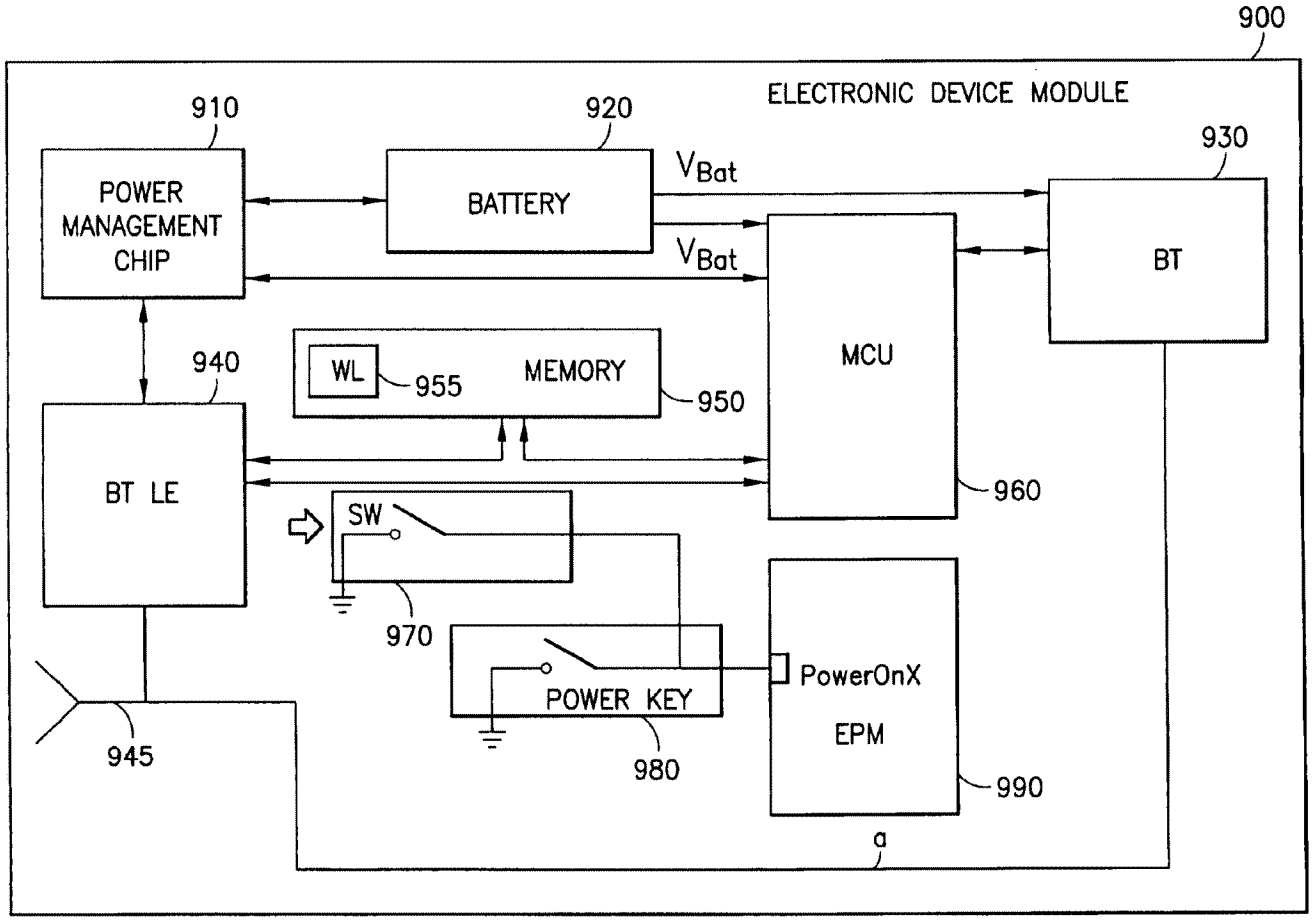
FIG. 9 is a schematic block diagram of an electronic device configured to include a BT LE chip, a power management chip and switch to receive wireless flashing and a BT chip to receiving firmware/software/content updates, in accordance with the exemplary embodiments of these teachings.
Figure 10:
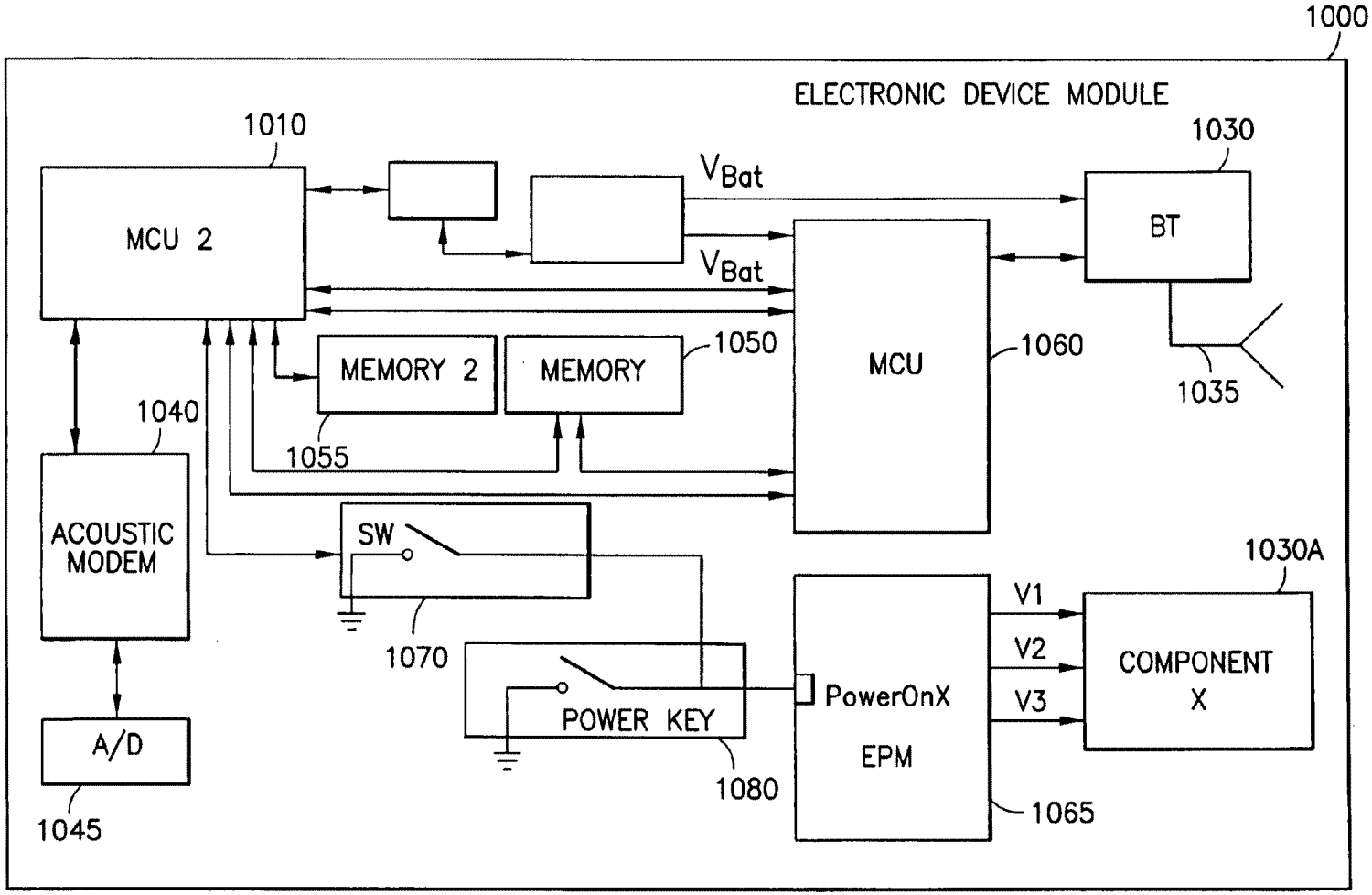
FIG. 10 is a schematic block diagram of an electronic device configured to include a second microcontroller, a regulator, a second memory, a switch and an acoustic modem to receive wireless flashing and a BT chip to receive firmware/software/content updates, in accordance with the exemplary embodiments of these teachings.

FIGS. 9 and 10 disclose alternative embodiments of these teachings. For example, FIG. 9 discloses a BT LE 940, PM chip 910, EPM chip 990 and a switch 970 coupled in parallel with the power key 980 and used for a flashing event and a Bluetooth chip 930 employed to transfer files (software and firmware updated) to the EDM 900. BT LE 940 also accesses memory 950 to check the white list 955 to determine whether an advertising packet unit should be responded. Both the BT LE 940 and BT 930 may share the same Bluetooth transceiver 945.

In FIG. 10, an acoustic modem 1040 together with a second microcontroller 1010 and a second memory 1055 and a switch 1070 are used for a flashing event. In this embodiment at least one microphone or other type transducer (not shown) contained within the electronic device is used to monitor for an acoustic trigger signal. This trigger signal could be provided by the wireless flashing initiator 100 via a loudspeaker (not shown). The frequency can be audible to humans or alternative in the infrasound and/or ultrasound spectrums. To guarantee a sufficiently long operating time, this sensing solution must have sufficiently low power consumption. Hence, the acoustic sensing solution may also include a separate low-power AD and DA-conversion unit 1045 as well as a data processing unit (microcontroller) 1010. In addition, duty cycling can be used to reduce the power to an acceptable level. Furthermore, the "acoustic modem" can contain enough computing power and memory to be able to make the decision whether the detected bit sequence is one of the correct ones that will result in powering on the rest of the device. Selection of an over the shelf acoustic modem should have sufficient control ports to be able to wake up the rest of the device and to informs the CPU about an upcoming flashing event.

As used above, the term "acoustic sensing" infers that the device already has adequate non-volatile memory and the correct settings for receiving a SW/firmware update over the broadband radio such as a WLAN 1080 and transceiver 1035. However, it is also possible to transfer data over the acoustic link (not shown) which can also be bidirectional when at least one of the loudspeakers of the target device is also used in the data transfer.

Alternatively, a microphone and loudspeaker could be replaced by a light sensor or light transceiver (not shown). In this case the light may be infrared (IR), near infrared, visible light or any other wavelength providing essentially the same functionality. In the case of a light transceiver, the sales package is made to be sufficiently transparent to the wavelengths of light used, either entirely or via a sufficiently large window.

As shown in FIG. 10, the electronic device module, includes an energy and power management (EPM) chip 1065 which provides electrical power to component X 1030A and can in various embodiments control power distributed to all or some of the components shown in FIG. 10. Component X 1030A represents any other component of the Electronic Device Module 1000.

Other configurations are possible using near field communications, a charging loop, infrared, Zigbee, or ANT™ radio devices (ANT™ is a type of low power personal or sensor network). With respect to the file transfer other possible modules can be connected to microcontroller 240 (see Component X 280) to affect a high speed data transfer of firmware or software updates. For example, in one or more exemplary embodiments of the present invention, Component X 280 can be a storage device suitable for storing software/firmware in ROM or RAM memory. Data can include software, firmware, user data or any other digital content which can be made available in any fixed storage media or in any detachable storage device such as a USB memory stick, eMMC, micro SD, SD card or any other detachable storage device. In one possible embodiment the EDM 200 can contain multiple versions of software and firmware, content or operating systems stored in memory. In later steps in the supply chain the unwanted versions can be removed/deleted. Accordingly, the flashing event would in this instant be an installation only flashing event.

Component X 280 can also be a sensor to detect movement of the electronic device. The sensor capabilities can also be coupled directly to the BT LE 1040 (not shown) as such it would not be necessary to trigger the EPM 200 or MCU 1060 to determine a sensor value or obtain a measurement. As discussed above, the present invention allows interaction with the device while in sale packaging. As such, it might be advantageous to configure the device to operate in different modes for either privacy or power saving modes. For example, a sensor would implemented at Component X 280 would in one embodiment of these teachings be configured to detect the orientation of the sale packaging (right side up). Therefore, employing such a sensor would allow for the electronic device to be stored in a warehouse in BT LE in scan mode. Then in transit, upon exiting the warehouse the warehouse pickers would be instructed to flip each box containing the electronic devices. The flipping of the boxes would trigger a change in the BT LE mode to advertising mode. Alternatively, the flipping of the sale packaging end to end could affect the entering into advertisement mode at the retail stage to allow faster connection step-up of the device. Other embodiments could include one of the following non-limiting examples, such as twisting, bending, or shaking, raising or lowering the temperature of the electronic device while in the sale packaging to obtain a similar result. Some non-limiting examples of sensors could be an accelerometer, capacitive displacement sensor, optical sensor, or a pressure sensor.

Figure 11:
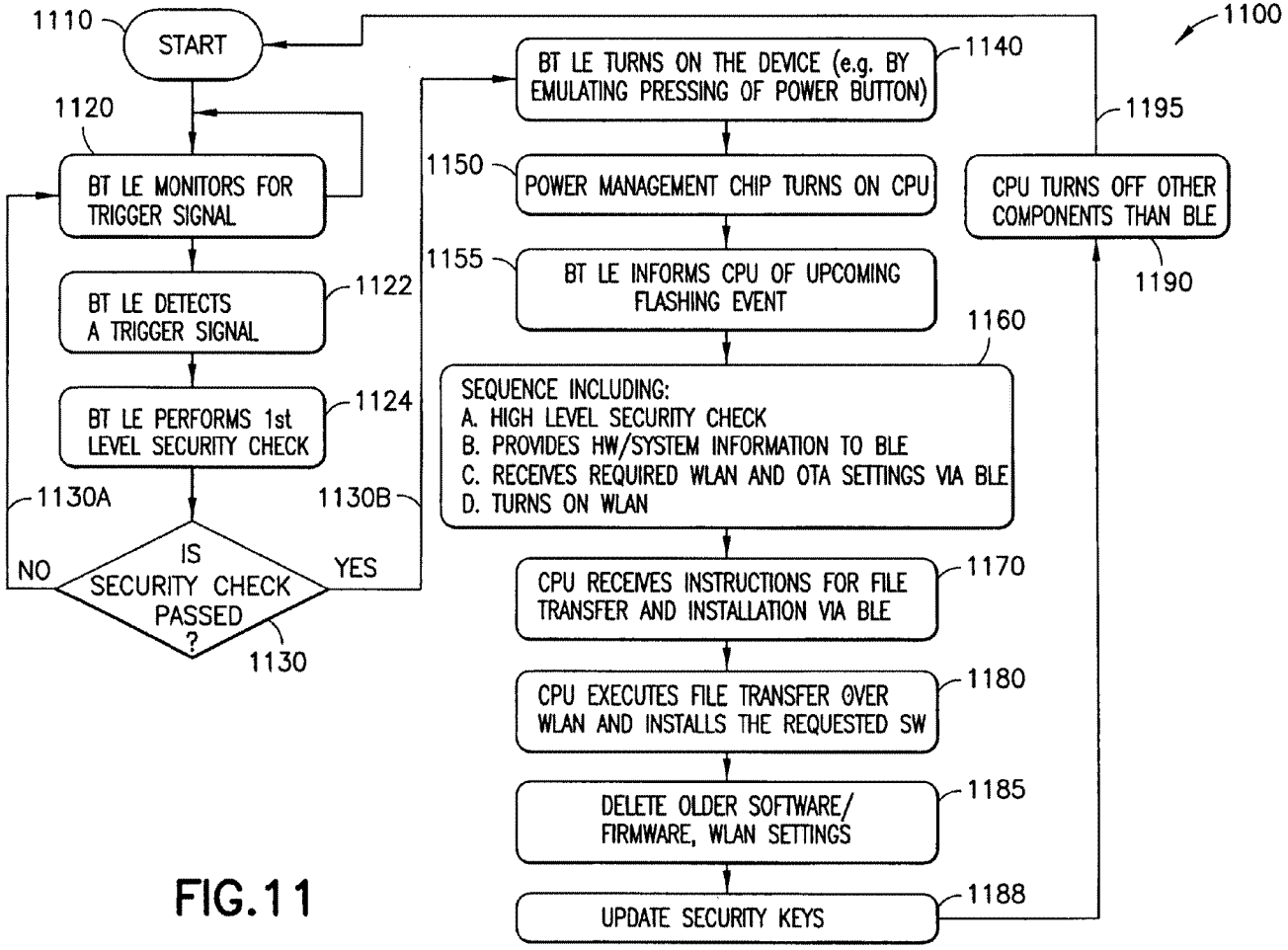
FIG. 11 is a logic flow diagram that illustrates the operation of a method, and a result of execution of computer program instructions to receive a flashing event and receive firmware and/or software and/or content updates, in accordance with another exemplary embodiment of these teachings.

In FIG. 11, another alternative exemplary embodiment of these teachings is illustrated in a logical flow chart showing a method and execution of computer instruction 1100. As shown there, the method or operation starts 1110 by configuring the BT LE link layers of at least one or more BT LE compliant devices in accordance with one or more exemplary embodiments of the present invention. At least two examples of BT LE configurations are provided for in this embodiment as non-limiting examples of advertising event types using either the connection direct event type or the connection undirected event type.

After the BT LE link layers have been configured, a first BT LE compliant device is designated to operate in a scan state to monitor for a trigger signal 1120 which can be a SCAN_REQ PDU or a CONNECTION_REQ PDU as explained above with respect to the Bluetooth Link Layer Specification. A second BT LE Compliant device is also configured to operate in the advertiser state to broadcast either PDU (trigger signal). Once the first BT LE compliant device receives either PDU from advertiser it detects the trigger 1122 and responses by checking its predetermined filtering policy. In one embodiment of these teachings, the advertising policy allows processing scans of all advertising events if the second BT LE device is within its white list and responding to same if that BT LE devices' address is contained within. Accordingly, the first BT LE device performs this $1^{st}$ level security check 1124 and determines whether security is passed 1130. An alternative or addition a first level security method could include setting a limit on the range of the low power radio to only allow wireless flashing at a predetermine range (e.g. adjusting the received signal strength indication (RSSI) measurement in the BT LE receiver). As such, long distance programming could be prohibited in certain phases of the supply chain. For example, this security measure could protect the devices in the distribution phase where the device could be sitting in a truck in a publicly accessible location. This could be accomplished by limiting a WFI 100 distance to a EDM 200 whereas BT LE connections would require set up packages to be received at a RSSI level higher than a certain minimum level. If the security check fails 1130A, the first BT LE resumes its monitoring by returning to that step (1120). On the other hand, if the second BT LE devices address is contained in the white list then the first and second BT LE devices transition into a connection state (not shown). In other words, the second BT LE device passed the first level security check 1130B.

Next after a connection is formed between the first and second BT LE devices, the first BT LE executes an algorithm to turn on a device which can be coupled to the first BT LE device 1140. In one exemplary example, the device can first turn on a microcontroller 240 (or similar processor) as described above with respect to the electronic module 200 shown in FIG. 3 (1150). Once the device is powered on instruction transmitted from the second BT LE compliant device can be transmitted to memory contained within the device which is coupled to the first BT LE compliant device. A power management chip turns on a CPU coupled to the first BT LE compliant device 1150. The BT LE compliant device then informs the CPU of an upcoming flashing event 1155.

Figure 12A:
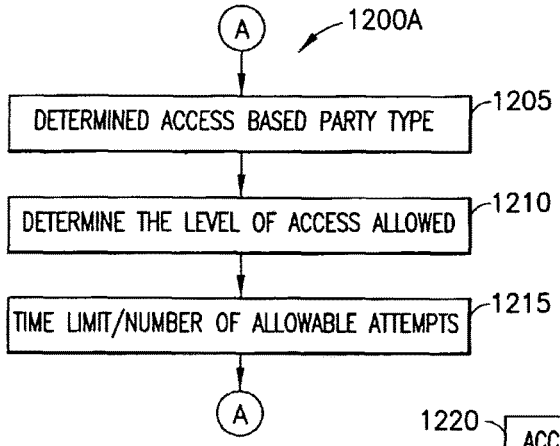
FIG. 12A is a logic flow diagram that illustrates a method step or operational sub-process to execute high level security with respect to the operation of a method, and a result of execution of computer program instructions, in accordance with another exemplary embodiment of these teachings.

Next, the CPU executes a wireless flashing sequence 1160. This step involves four sub-steps or sub-routines. The first sub routine (A) executes a high level security check 1200A as shown in FIG. 12A involving authentication process involves three sub-steps applying a high level security policy discussed above. The first step can be determined based on the type of user seeking access (e.g. manufacturers, retail operators, consumers or the like) 1205. The second sub step can determine the level of access (read, transfer files, install software/firmware/content and the like) 1210. A third sub step can set a time limit or set the number of allowable attempts 1215. The three sub-steps shown in FIG. 12A merely provide one possible embodiment and are non-limiting as other combinations and additional sub steps including additional security policies can be added.

Figure 12B:
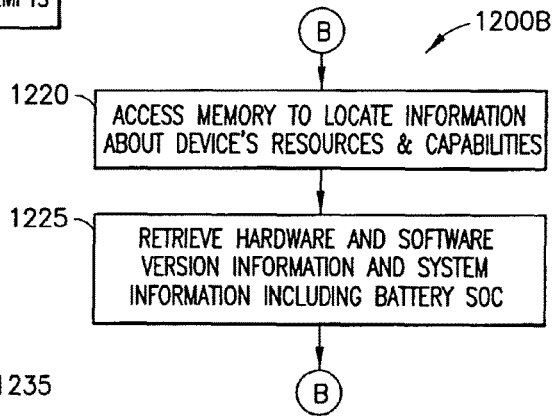
FIG. 12B is a logic flow diagram that illustrates a method step or operational sub-process to retrieve hardware and system information with respect to the operation of a method, and a result of execution of computer program instructions, in accordance with another exemplary embodiment of these teachings.

A second subroutine (B) shown in FIG. 12B, provides hardware and system information back to the second BT LE compliant device to determine if a flashing event is possible based upon system constrains (e.g. memory, power dissipation and storage) 1200B. As shown in FIG. 12B, the first BT LE compliant device accesses memory of the second BT LE compliant device to locate information about the device's resources and capabilities. 1220 The first BT LE compliant device receives hardware and software version information and well as other system information such as battery state of charge (SOC) transmitted from the second BT LE compliant device. 1225. The second BT LE compliant device may also include sub-sub steps of sub step 1220 (not shown) to provide information about the charging level of its battery so the first BT LE compliant device can determine if one of the following five possible scenarios can occur: (1) transfer of any data (e.g. if the software/firmware/content can be transferred at all); (2) transfer of the full data without installing the software (e.g. install after next boot); (3) transfer the full data load and run installation of the software/firmware/content in the second BT LE compliant device; (4) transfer the full software/firmware/content, install it and determined how much more content can be transfer to the device; and/or (5) removal of electronic device from sale box to make data transfer (battery is not strong enough).

Figure 12C:
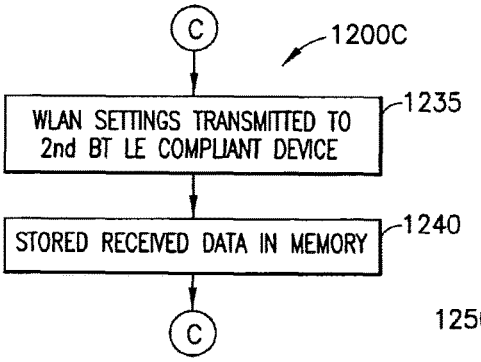
FIG. 12C is a logic flow diagram that illustrates a method step or operational sub-process to receive WLAN and network setting with respect to the operation of a method, and a result of execution of computer program instructions, in accordance with another exemplary embodiment of these teachings.

The third subroutine (C) shown in FIG. 12C, allows for the first BT LE to receive WLAN settings and over the air settings via BT LE radio to allow for transfer of data via a WLAN to the device coupled to the first BT LE device 1200C. As shown in FIG. 12C, WLAN settings are transmitted to the second BT LE compliant device 1235 including the name of a secure communication network, the service set identifier (SSID) of the access point, security settings, security keys and key indexes. Also, over the air settings including the name of a remote server together with its IP address and port address can be received by the second BT LE device. It is also possible that some other connectivity is used, such as Bluetooth, instead of WLAN. All data received by the second BT LE compliant device are stored in memory 1240.

Figure 12D:
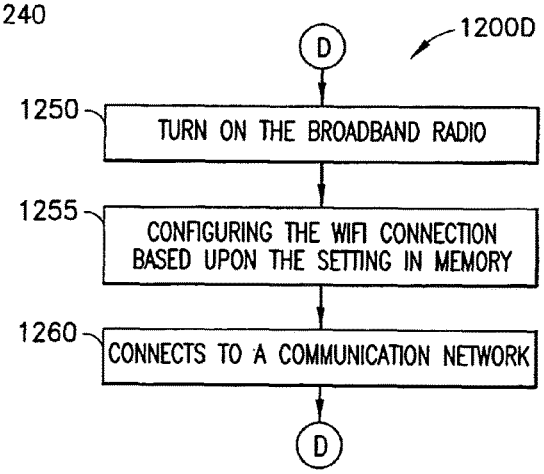
FIG. 12D is a logic flow diagram that illustrates a method step or operational sub-process to turn on a WLAN with respect to the operation of a method, and a result of execution of computer program instructions, in accordance with another exemplary embodiment of these teachings.

The fourth subroutine (D) shown in FIG. 12D, allows for the CPU to turn on WLAN coupled to that device to allow for the device to receive software or other content to be stored in memory coupled to the CPU 1200D. The first sub step involves turning on the broadband radio such as a WLAN 1250. As mentioned above, other high data rate radio devices can be employed such as modems allowing WCDMA, LTE, LTE-A, WiGig, UWB/60 GHz, UTRAN, GSM, BT LAN, or near-me area network (NAN) (e.g. employing close proximity communication technologies such as high data-rate extension of NFC or RFID etc.) This sub step could include additional security control sub steps as discussed above. The next sub step involves configuring the WiFi/WLAN connection based upon the setting received from the first BT LE complaint device and stored in memory 1255. Next the second BT LE compliant device connects to a communication network 1260. In an alternative embodiment, sub step 1235 discussed above and shown in FIG. 12C can occur at the same time as turning on the WLAN.

After completing the above four sub routines, the CPU coupled to the first BT LE compliant device receives instructions for file transfer and installation instructions from the second BT LE compliant device 1170. Alternatively, all or part of the instructions can be shared over a broadband radio connection. Thereafter, the CPU executes a file transfer over the WLAN and installs software or content 1180.

As discussed above at various stages of the supply chain it might be necessary to reconfigure the electronic devices. As show in FIG. 11, after software/firmware has been installed it might be desirable to delete the data or the WLAN setting 1185. The closing of the wireless flashing event session may also include an updated security key and/or settings needed to establish the next software/firmware/content session 1188. The security setting can be updated both in the wireless flashing initiator 100 and the BT LE complaint device (or system wide). In addition, the white list can be erased, modified or updated at this point. Also, the BT LE mode can be set at this point (scanning mode vs. advertisement mode).

Once the content or software is installed the CPU turns off all other components (e.g. the WLAN) 1190. Finally, the first BT LE compliant device turns off the CPU in a similar manner as it turned on the CPU 1195 or the CPU turns itself off.

These teachings are not limited to supply chain operations, and the examples provided in FIGS. 5 and 6 are not meant to be limitations but to provide clarity of the principles detailed herein by utilizing specific examples. Other possible uses for these teachings include asset tracking, automated wireless inventory or to allow positioning of the electronic device 200 using high accuracy indoor positioning (HAIP) or some other indoor or local positioning technology using BT LE, BT, WLAN or similar technology.

With respect to asset tracking, one exemplary embodiment of these teachings involves an automated wireless flashing inquiry event to obtain inventory of the devices. Inventory could include the current versions of software and firmware on each device, destinations and storage location within factory or warehouse.

Referring back to FIG. 3, the EDM 200 can further include a low power clock (not shown) coupled to the controller 240 and can access additional control ports (not shown) on the controller. This further embodiment would be configured to wake up (power on) the relevant parts of the device at predefined times (e.g. twice a day, once a day, once every two days, once a week, depending on the desired shelf-life of the feature). Once the device is powered on it connects to a predefined over the air server via a predetermined broadband radio and a wireless flashing inquiry event can occur. Prior to waking up the device each device would check the energy level of its power source and if sufficient it would respond to the wireless flashing inquiry event. If adequate power is available the device response to an inquiry (e.g. informs the inquirer of its location, current software or firmware version or other information). After the data is transmitted and placed in a database, the device returns back to the mode where the clock will again wake up the electronic device at predetermined times. An alternative embodiment of this particular aspect of the invention could be implemented with a BT radio instead of a BT LE radio. For example as shown in FIG. 9, BT radio could be accessed via transceiver 945 together with a clock (not shown) couple to MCU 960 with various predetermined time entries saved in memory 950 (not shown).

Figure 14:
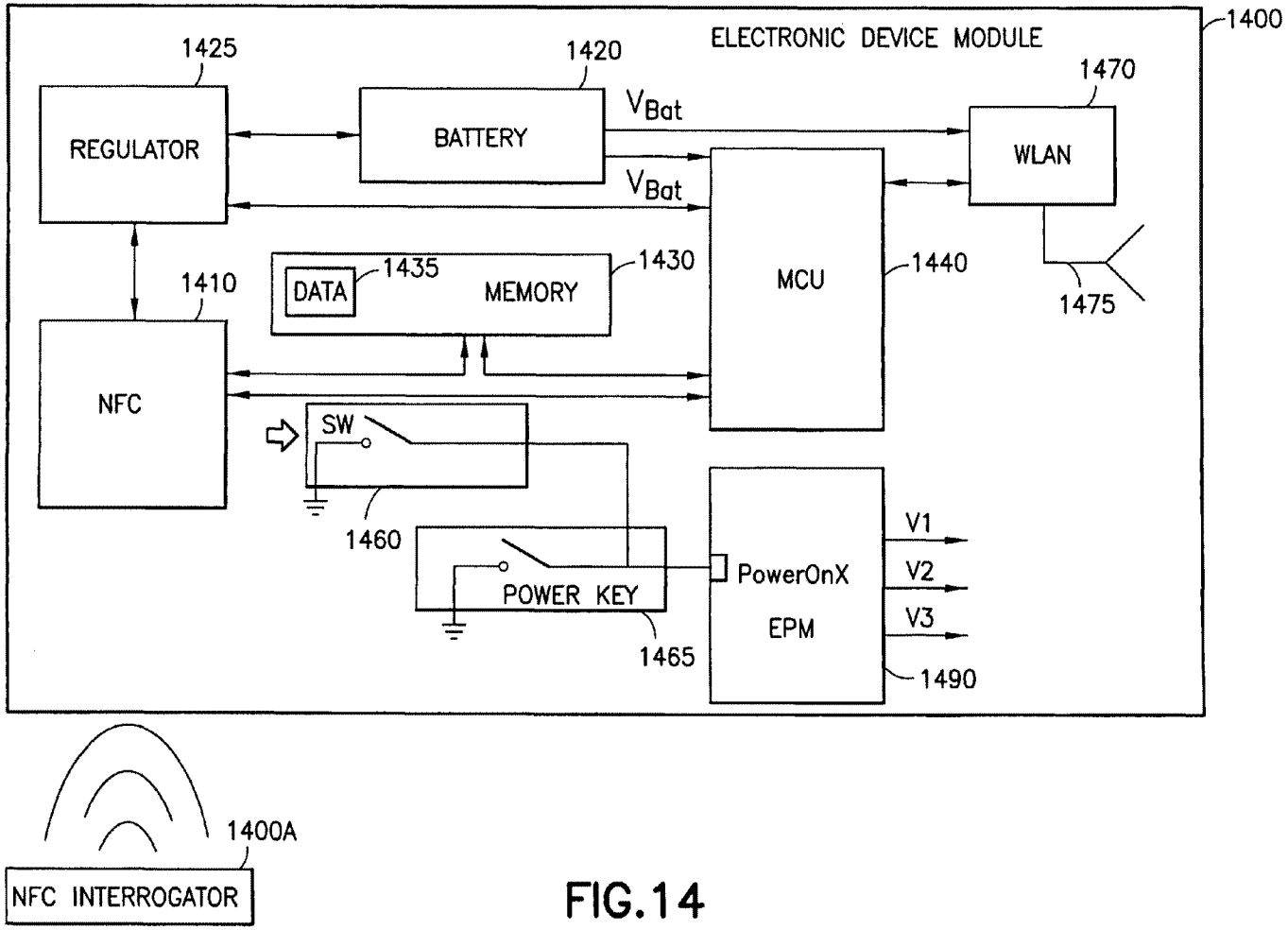
FIG. 14 is a schematic block diagram of an electronic device configured to include near field communication functionality to receive a wireless flashing from a near field interrogator and to receive firmware/software updates (or content) via a WLAN, in accordance with the exemplary embodiments of these teachings.

FIG. 14 provides an illustration of yet another embodiment of these teachings. In FIG. 14, an electronic device is configured to include near field communication functionality 1400 to receive wireless flashing from a near field interrogator 1400A. As shown in EDM 1400, a NFC unit 1410 is coupled to a regulator 1425 which is further coupled to battery 1420 and MCU 1440. In a similar fashion, as discussed above with respect to BT LE embodiment of FIG. 3, a signal is received in NFC unit 1410 from NFC interrogator 1400A. The NFC interrogator 1400A operates at a distance of 4 cm or less but can operate at distances as great as up to 20 cm and at 13.56 MHz. In one particular embodiment of the present invention, NFC interrogator 1400A and NFC unit 1410 include ISO/IEC 18000-3 air interface and at each transmit and receive data at rates ranging from 106 kbit/s to 424 kbit/s. Furthermore, NFC unit 1410 and NFC interrogator 1400A can employ two different coding methods to transfer data. For example, if an active device transfers data at 106 kbit/s, a modified Miller coding with 100% modulation can be used. In all other cases Manchester coding can be used with a modulation ratio of 10%. The decoded signal can provide a measure of authentication by comparing know device IMEI or MAC address (or other identifier) to data 1435 in memory 1430. Should the address be found in memory 1430, switch 1460 can be engaged to emulate a power on state of the device. In other words, emulating power key 1465 coupled to the PowerOnx pin of EPM 1490. Further instructions can be executed to power on WLAN 1470 to engage in software/firmware updates or to receive content via transceiver 1475.

Figure 15:
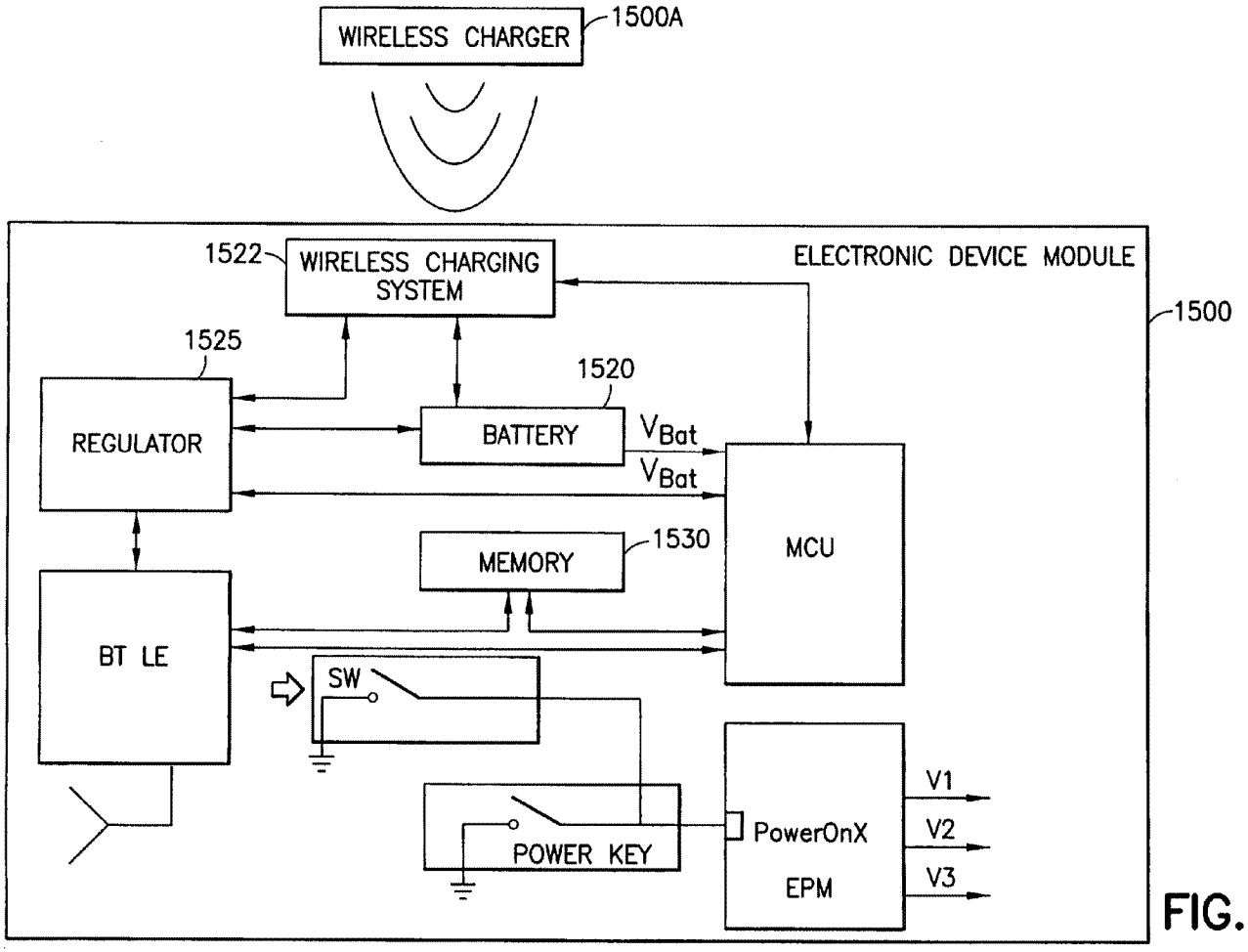
FIG. 15 is a schematic block diagram of the electronic device of FIG. 3 configured to include a wireless charging system for receiving a remote energy charge from a wireless charger, in accordance with the exemplary embodiments of these teachings.

An additional embodiment of the present invention include a wireless charging unit 1522 for receiving a remote energy charge from a wireless charger 1500A, in accordance with the exemplary embodiments of these teachings. As shown in FIG. 15, an EDM 1500 includes a wireless charging unit 1522 configured to charge battery 1520 based upon data recorded and maintained in memory 1530 by MCU 1540. For example, data would be recorded in memory with respect to battery's state of charge (SOC) and various thresholds setting such as minimum and maximum charge depending on the type of battery in use. In operating the wireless charging unit 1522 would together with regulator 1525 maintain a specific charging level of battery 1520 (e.g. avoid overcharging). Wireless charger 1500A could be activated independently or in conjunction with a wireless charging system as discussed below with respect to FIG. 16. Wireless charger 1500A can be an inductive wireless charger or longer distance charger which would include resonant loops (magnetoresonant charger), or a low power RF charger for powering on EDM 1500.

Figure 16:
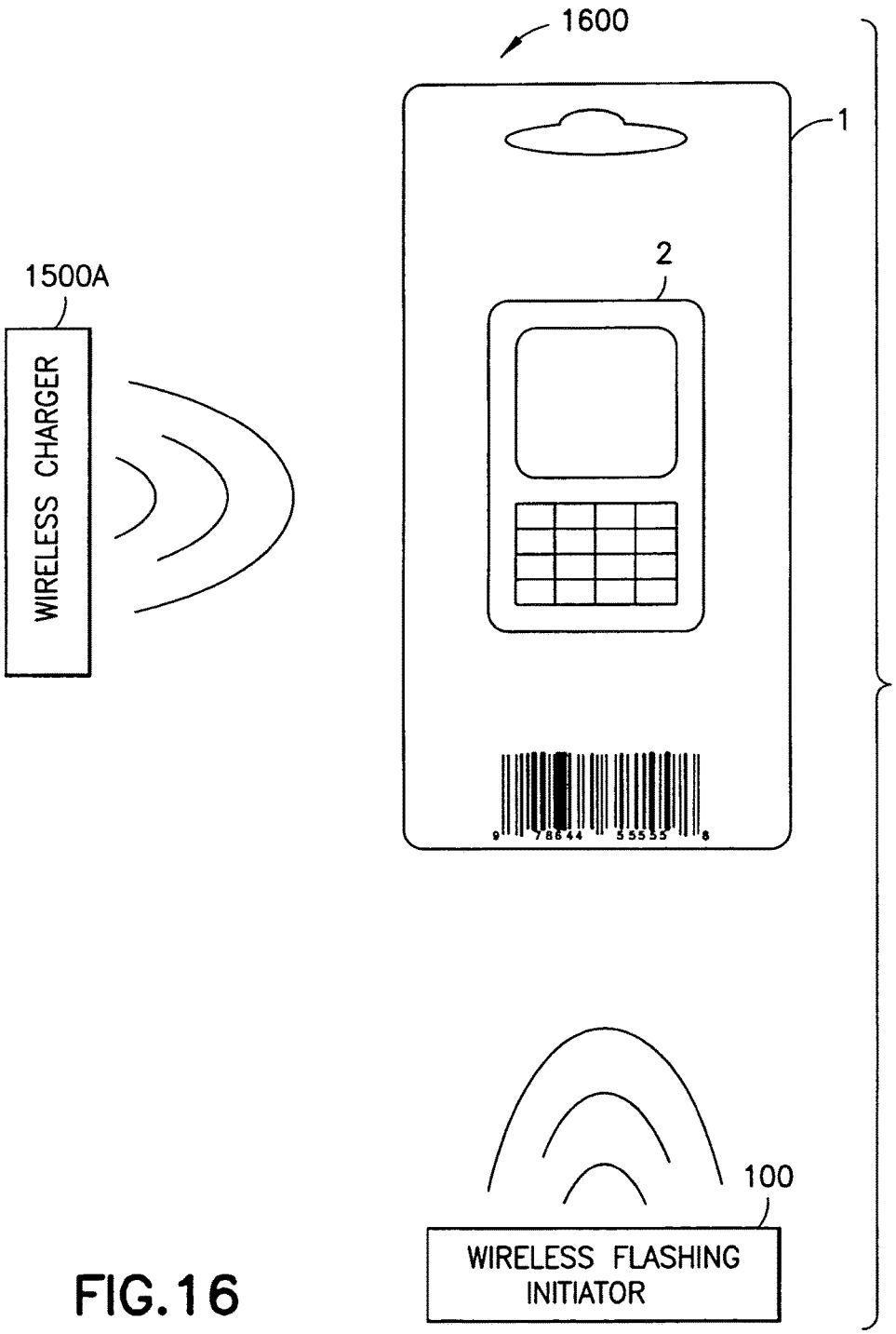
FIG. 16 is an illustration of a system of wirelessly charging an electronic device while simultaneously deploying a wireless flashing event by a wireless flashing initiator, in accordance with the exemplary embodiments of these teachings.

Referring now to FIG. 16 a system of wirelessly charging an electronic device 2 is illustrated. A shown in FIG. 16, an electronic device 2 is inside sales packing 1. Electronic device 2 could be inserted inside boxes which are even further buried deep inside a pallet in a remote area of a warehouse. According to one exemplary embodiment of the present invention, the one or more of the above described methods of wirelessly flashing an electronic device and wireless charging can occur at the same time. In other word, (optionally) simultaneously deploying a wireless flashing event by a wireless flashing initiator 100 and deploy an energy charge by a wireless charger 1500A to electronic device 2. Although, FIG. 16 illustrates wireless charger 1500A and wireless flashing initiator 100 as two separate devices they can be combined into one device.

To initiate the above dual system, an electronic device 2 (in a sales package) is placed in proximity of wireless charger 1500A. Wireless charger 1500A can be a docking station or a handheld wand or the like which can be beamed or focused upon electronic device 2. The beaming or focusing on the device could in one embodiment cause the device to receive a signal which would in turn initiate powering on of the circuits that are essential for wireless flashing/software transfer as described above. In other words, the devices could in one extreme be equipped with an uncharged battery and no security implement to prevent access. This would occur in the factory or warehouse where less security would be needed. In this embodiment, the charging of the battery could trigger the turning on of the device. Software previously loaded on the device would thereafter automatically (based upon this triggering event of receiving power) turn on various security measures such as the first and second level security discussed above and possibly additional parameters discussed in some of the above embodiments (e.g. switch BT LE modes from scanning to advertising states).

Alternatively, wireless charger 1500A could provide power needed to carry out any of the wireless flashing events discussed above in the various embodiment of the present invention. In other words, adding a charge to the battery to avoid draining the battery during the wireless flashing event. This could occur either before, after or simultaneously to a wireless flashing event.

Figure 17:
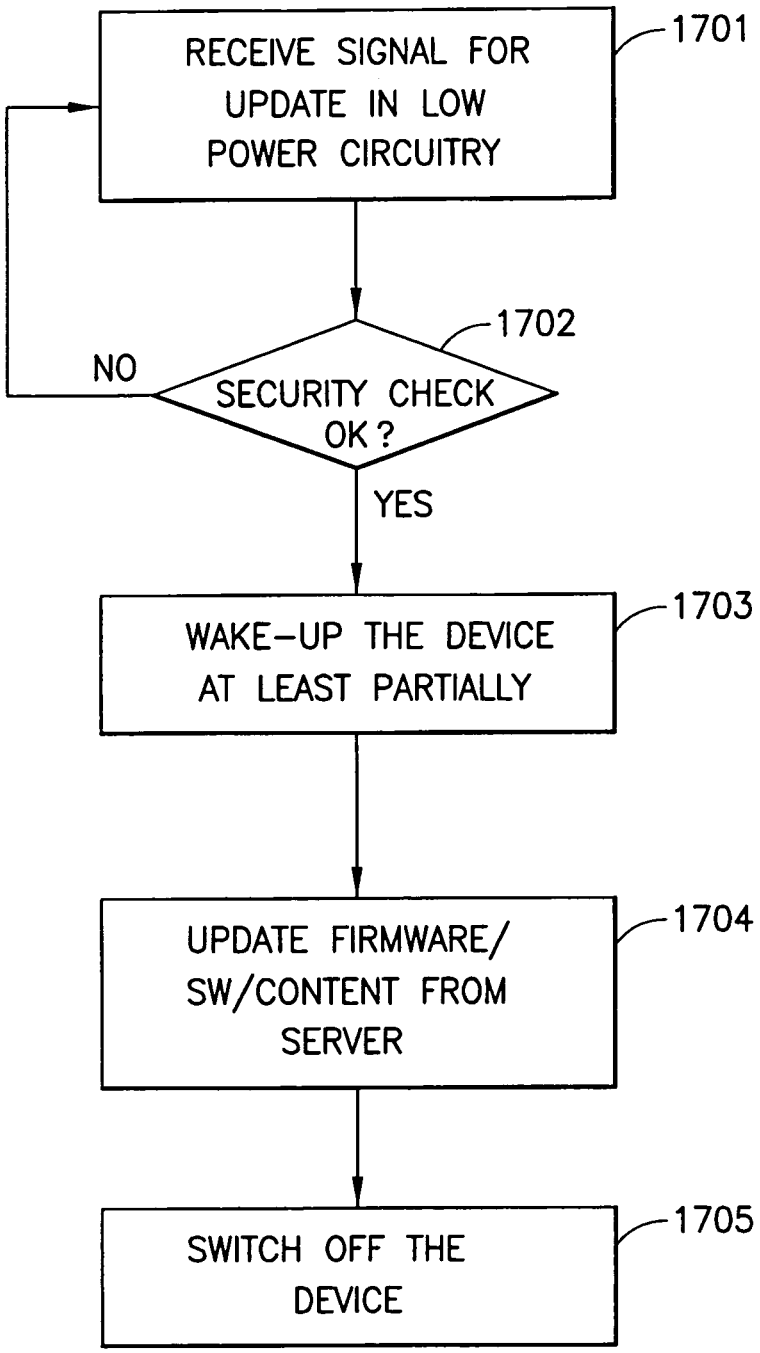
FIG. 17 is a process flow diagram summarizing certain of the exemplary embodiments of these teachings.

The above teachings are generally summarized at the flow diagram of FIG. 17. At 1701 the electronic device receives a wireless signal for updating software/firmware/content, and this signal is received in low power (first) circuitry of the device. Above this was characterized as the trigger, and it may be a radio signal (BT, NFC, etc) or audio, infrared, timer, or even a wireless charging signal. A first level security check is performed at 1702, such as checking the IMEI or MAC address against a whitelist. There may be additional security checks performed one after the other which are each conditional on satisfying the immediately preceding security check as detailed above, and each security check may be more complex to assure serially higher levels of security. Conditional on passing that one or more security check(s), some other (second) radio circuitry of the device, or even the whole device, is powered up at block 1703. This second circuitry is the means by which the electronic device wirelessly receives its software and/or firmware update or data content at block 1704. Once complete, including forward error control checks on the installed software/firmware/content, the device autonomously switches off at least the second circuitry at block 1705, and it may switch off completely.

In this manner the system wakes-up the mobile device for flashing the firmware, delivering and installing software and/or storing content, which as detailed above is quite useful at least when the device is in its retail packaging and in transit between the manufacturing facility and the end retail customer not least for enabling the manufactured device to be put into the supply/distribution chain earlier without risking the need for manual intervention to install updates or content that may become valid only after the device has left the factory. An added benefit is that these teachings can be used to install customer-personalized data onto devices at the point of sale without the need for retail associates to even open the sales box. For example, such customer-personalized data or personalization content may include pictures, applications, contact information, calendar entries, historical short messages/emails, user settings, and the like which are transferred from the purchaser's old mobile terminal to while the new terminal is still in its sealed retail packaging. From a manufacturing perspective this also allows the factory to install for each model of a given device only a single base software platform, which can then be updated for local, regional or national markets as they enter those markets.

The low power (first) circuitry of the device in effects acts as a "wireless gate keeper" that wakes up the more power demanding parts of the mobile device and possibly also performs the first level security check. Multiple steps and levels of security checks also ensure low power consumption for the packaged electronic device to assure a sufficient shelf life in the standby mode as well as a guarantee of security in the product delivered to the end retail user. The second circuitry can be a WLAN radio or some other broadband radio for transferring the data to the device, which can be done using existing firmware over-the-air routines which conventionally deliver data/software/content to devices over cellular links and only after those devices have been purchased by the end user. The low power circuitry for waking up other more power-intensive portions of the device may be based on Bluetooth Low Energy (BT LE), Near Field Communication (NFC), wireless recharging loop, a local computer readable memory (see for example co-owned U.S. Patent Publication 2010/0318712 A1 by Sergey Boldyrev et al), audio, infrared, or a timer.

The above multitude of embodiments can be further extended such that the device is configured to respond to multiple different wake-up methods in series, or in parallel, or in loops. One advantage of this is that, during the supply/distribution logistical chain from manufacturing facility to end user the need for, and/or the likelihood and nature of updates may vary. Configuring the electronic device to respond to more than one wake-up instance, whether these wake-up instances are in series (changing the update method during the logistics chain), in parallel (using several update methods at the same time) or in loop (returning to an earlier update method) enables an added improvement in energy-efficiency/battery life, security, and in just how flexible these techniques can be.

Figure 18:
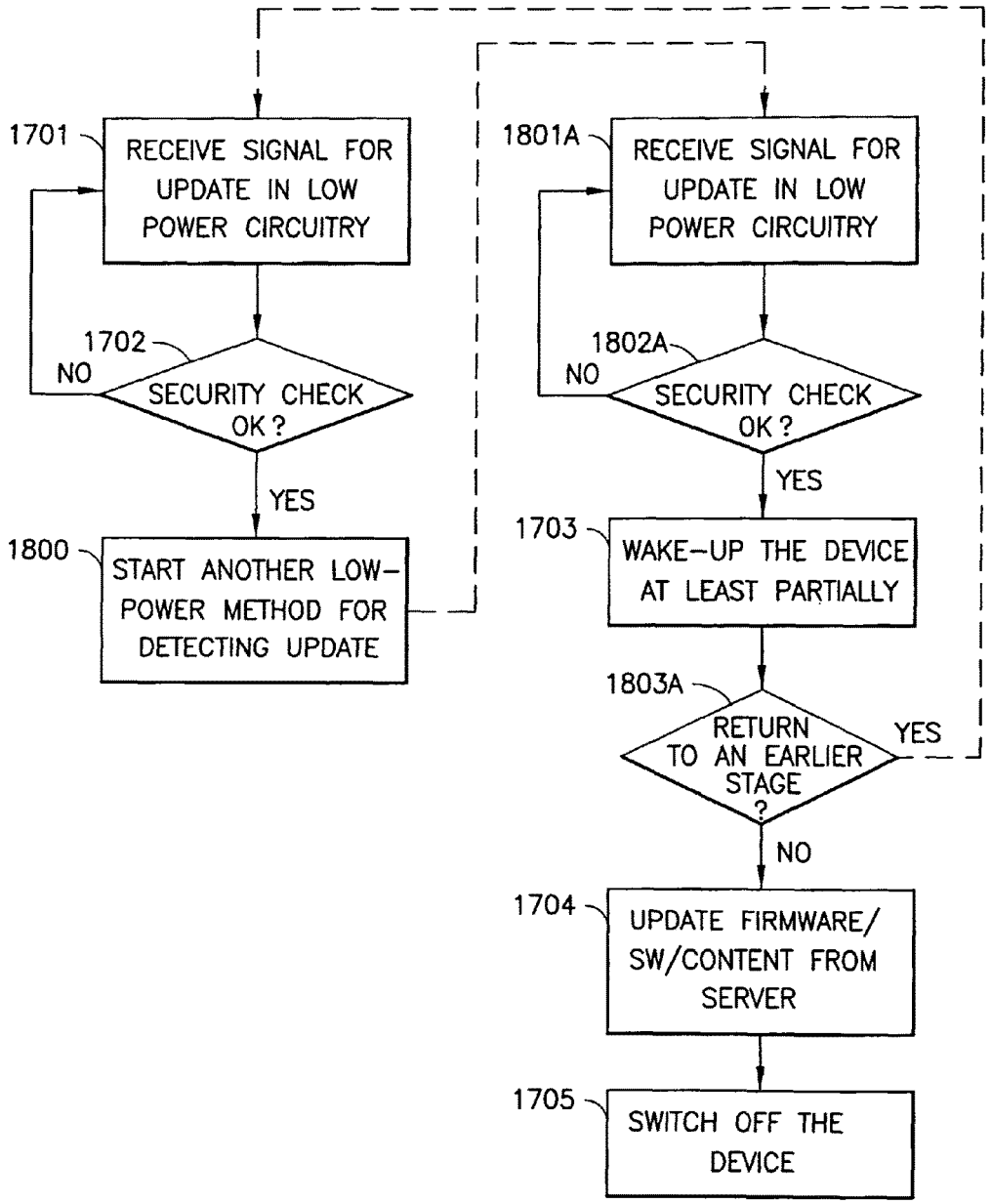
FIG. 18 is similar to FIG. 17 but illustrating two different wake-up methods in parallel before a software/firmware/data download can be enabled for the host electronic device, according to an exemplary embodiment of these teachings.

FIG. 18 is a process flow diagram illustrating in general terms this aspect of these teachings, and FIGS. 19A-E provide various different specific but non-limiting implementations of FIG. 18. The first two blocks are as described for FIG. 17, but the follow on step after passing the first security check at block 1702 is then block 1800 where another low power method, different from that at block 1701, is used to detect an update. It is also possible that the low-power wakeup methods in blocks 1701 and 1800 use the same technology but with different characteristics. For example, for enhanced security the device may be woken up first with BT LE in a warehouse and then again with BT LE in a retail shop. In this case the earlier wake up may act as an enabling authorization for the later retail shop flashing. The low-power wake-up method used in block 1701 is used to start another low-power wake-up method in block 1800 of a different technology; one may be BT and the other may be a wireless charging signal. 1801A and 1802A are similar to 1701 and 1702 but using a different implementation of the same principle, thus increasing security and as will be seen for FIGS. 19C and D increasing flexibility also. Blocks 1704 and 1705 are similar to those described for FIG. 17, but note the addition in FIG. 18 of block 1803A. This is a loop back to an earlier stage, which is particularly valuable if the device is enabled to awaken multiple times to check for some update while in the logistics chain but perhaps there is no update to download during one of those wake-up instances.

Figure 19A:
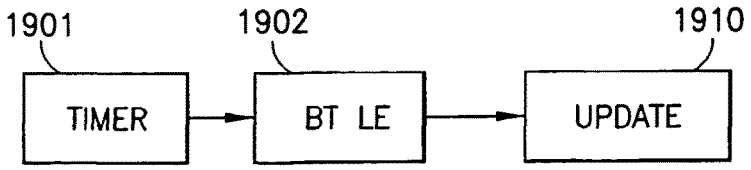
FIGS. 19A-E each illustrates a different variation on the process flow diagram of FIG. 18, according to further exemplary embodiments of these teachings.

FIG. 18 shows the two different wake-up methods in series, and FIG. 19A illustrates a specific example in which blocks 1701 and 1702 and 1800 of FIG. 18 are implemented as the timer 1901 of FIG. 19A and blocks 1801A and 1802A and 1703 are implemented as the BT LE radio 1902 of FIG. 19A. Then the remaining update procedure 1910 of FIG. 19A represents blocks 1704 and 1705 of FIG. 18. As a specific clarifying example of the advantage of FIG. 19A, consider that at the factory a timer based wakeup 1901 is used. The device is made to start to use the BT LE based system 1902 after a time period when the device can be estimated to be in a warehouse with wireless flashing capability. Once the timer 1901 activates the BT LE based flashing 1902, the device starts to scan (or in another configuration transmit) BT LE signals at 1902 and it is possible to connect remotely to the device and update it. This will allow much reduced energy consumption since a simple timer circuitry 1901 can be made much more energy efficient than BT LE operations 1902. This implementation also increases security, in that the timer 1901 dictates when the device starts to scan for external BT LE signals 1902, making it less likely that an unauthorized third party can access the devices during shipping from the factory to the end retail destination.

Figure 19B:
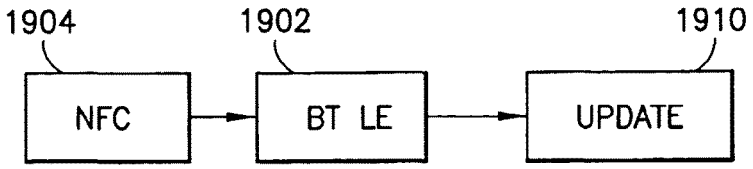

FIG. 19B is a similar example with a NFC radio wake-up method 1904 in place of the time 1901 of FIG. 19A. Following a similar example as immediately above, in the case of FIG. 19B the device does not have anything active, neither timer nor BT LE radio running, when it leaves the factory. At some warehouse for example along the logistics chain the sales box is taken to a NFC reader that powers a circuitry 1904 that wakes up the BT LE 1902. After this, the BT LE starts to scan as described in more detail above. The FIG. 19B implementation for this example eliminates the energy consumption totally between the factory and the warehouse. This also improves security since both a properly configured NFC 1904 and BT LE radio 1902 is needed to wake-up the device. Of course FIGS. 19A-B are non-limiting examples; a wireless recharging device or RFID technology (for example, scanning for an electronic product code EPC which is an open standard developed for logistics purposes and freely available for download) or any of the other methods above can be used in place of the NFC radio 1904. In the case of an RFID, one implementation may have an EPC tag embedded into the phone hardware and used to wake-up the BT LE functionality by using an EPC writer embodying the wireless flashing initiator 200 which was detailed above.

In this regard, in a variation on the series deployment an earlier stage can change or modify the parameters of the technology used in the next stage. For example, the NFC radio 1904 of FIG. 19B may receive external signals that impact the operation parameters or mode of the BT LE wake-up method at 1902 of FIG. 19B once that BT LE is activated. Such parameters may consist of some desired operating mode (scanning, advertising, etc as detailed above), security keys, and the like.

Figure 19C:
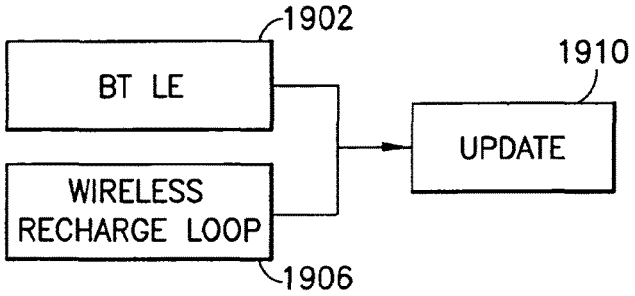

FIG. 19C is an example of using two different wake-up methods/technologies in parallel, BT LE 1902 and a wireless recharging loop 1906 in this example. Both are needed to allow the update. In one example of this, the factory sets the device to look for a BT LE signal. To allow a flashing of firmware, the device needs to get a valid BT LE wake-up (first trigger) as well as a proper signal from wireless recharge loop (second or additional trigger) in order to wake up the device. This will enhance the security since two separate transmitters using different technology are needed with their individual security features, the BT signal/first trigger signal is not recognized by the wireless recharge loop and the second trigger/wireless recharge signal is not recognized by the BT LE radio. By including the recharging loop as one of these two parallel wake-up methods it is also possible to ensure the device will be powered properly during the update, even if the battery is low. The wireless recharge link (for example, Qi is one standardized wireless recharge technology that could be implemented) provides a control link from the phone to the charger. In this context the control link can be also used to indicate to the writer if the device under wireless flashing is in the sales package with or without a battery. In the latter case, the sales package can then be positioned accordingly to ensure continuous power transfer during the update, meaning for example that the package cannot be moved from a retail seller's storeroom to the retail sales floor during the update. But this can restriction can be automatically indicated by the writer 200 user interface to the person who is doing the update.

In other embodiments there may be two or more different wake-up methods configured in parallel and only one is enough to advance the process to the software/firmware/data download stage (or security check, whichever is next after the parallel wake-up methods). For example, if we substitute a NFC radio 1904 for the wireless recharge loop 1906 of FIG. 19C, the next stage of FIG. 19C is the update stage 1910 which may be entered with either the BT LE signal 1902 or with an NFC signal, whichever comes first. This is especially useful in situations where it is not exactly known what kind of wake-up method is available, for example in a retail shop.

Figure 19D:
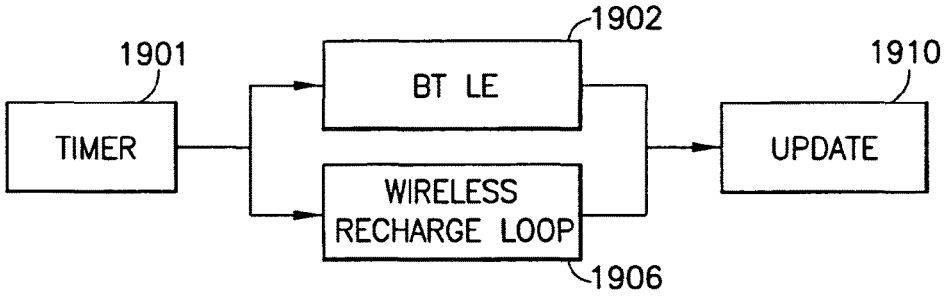

FIG. 19D provides an example of combined serial and parallel wake-up methods. Consider an example in which a timer 1901 is deployed at the manufacturing facility such that after some suitable period of time its expiration initializes both BT LE 1902 and wireless recharge loop methods 1906. Then the device is updated 1910 by applying both the BT LE and wireless recharge loop signals in parallel.

Just as FIG. 19D combines principles set forth at FIGS. 19A and 19C, other combinations are within these teachings, not limited to two-stage wake-up; any number of stages in series and/or parallel is possible. For example, NFC can be used to start a timer which in turn starts a BT LE scan or advertising. Additionally, various combinations of wake-up methods in series and parallel are possible beyond those specific examples set forth above. It should be also understood that the different stages may use the same technology. For example, the first wake-up method may be timer, the second and the third stage are based on BT LE while the fourth is again a timer based method. Different (and in some cases consecutive) stages may also employ different modes (features, functions or versions) of the same radio standard (or radio chip or radio technology), such as Bluetooth low energy mode (Bluetooth 4.0) for monitoring the trigger signal and Bluetooth 2.1 EDR (or 3.0 HS) mode for the software/firmware/content transfer. These may be different modes of the same radio chip.

Figure 19E:
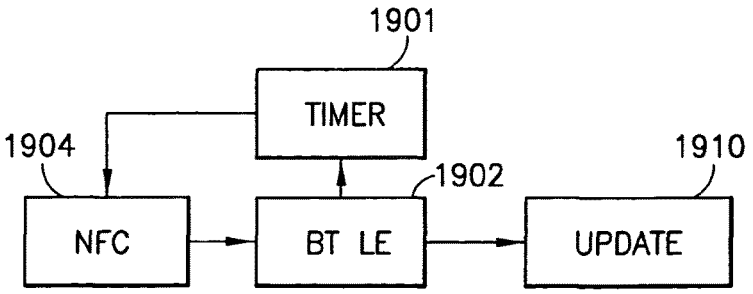

Another variation on the principles set forth with FIGS. 18 and 19A-D is a looped arrangement as shown by example at FIG. 19E. In this case, the overall process returns to an earlier stage based on some criteria. For example, when the device receives a suitable NFC signal 1904, it wakes-up the BT LE 1902 such as was described above for FIG. 19B. However, in the FIG. 19E example there is also a timer 1901 which is initiated. If the device is not receiving an update within some time period, the timer 1901 expires and returns the device to an earlier stage, which in the FIG. 19E example is to switch off its BT LE radio 1902 and await a new suitable NFC signal 1904. More generally, an earlier stage (NFC 1904 in this case) is entered if no suitable update is received with a given time period. Such a process may also change the operational parameters and/or mode of the method. This might be done by updating the parameters as detailed above, for example for FIG. 19E the next time that the BT LE stage 1902 is entered, the BT mode is changed from scanning mode to advertising mode.

In a more specific embodiment of the principles set forth at FIG. 19E, the criteria for returning to some earlier stage may also be some signal from the current stage (a BT LE signal such as a Cancel—command for FIG. 19E) that commands the device backwards in the process. Or for added redundancy a combination of multiple different signals and timers may be necessary to revert to an earlier stage.

In one aspect of these teachings there is a method, and an apparatus/electronic device having at least one processor and a program stored on a memory, in which the program when executed causes the electronic device to power up at least second circuitry of the electronic device in response to wirelessly receiving a trigger signal at first circuitry of an electronic device. In the above examples the first circuitry was detailed by example as a radio receiver for Bluetooth, Zigbee, ANT™, near field communications, impulse-ultra wideband UWB (see co-owned U.S. Patent Publication 2010/0318712 referenced above) or radio frequency identification signals; or a receiver of wireless audio or infrared, or circuitry for wirelessly receiving battery recharging signals. The electronic device then wirelessly receives a second signal at the powered up second circuitry. Specifically, the second signal is characterized by being consistent with a radio access technology for which the trigger signal is incompatible.

Above was discussed Bluetooth low energy BT LE. This radio protocol is slightly different from traditional (classic) Bluetooth even though it uses the same frequency range (2402-2480 MHz) as traditional Bluetooth networks. Specifically, in current iterations BT LE uses 40 channels that are 2 MHz apart whereas in traditional Bluetooth 79 channels are used with a 1 MHz channel raster. Additionally, BT LE uses a different frequency hopping scheme than traditional Bluetooth. In this regard then, BT LE signals are incompatible with traditional Bluetooth radio access technology, even though the BT LE and the traditional Bluetooth RF chains might be embodied on the same microchip and those two RF chains may even share some of the same hardware. The traditional Bluetooth RF chain cannot recognize the BT LE signal when the traditional Bluetooth RF chain is set with the traditional Bluetooth (software-defined) parameters. So in one exemplary embodiment the trigger signal can be BT LE and the software/firmware/content update can be made via the traditional Bluetooth radio access technology for which the BT LE trigger signal is incompatible.

Also in some of the above embodiment there was an initial step of a timer expiring, upon which the electronic device autonomously powered up its low power receiver for receiving the trigger signal.

Certain of the above embodiments also added a security feature, a first security check is performed in response to receiving the trigger signal and powering up of at least the second circuitry of the electronic device is conditional on passing the first security check. Form multiple security levels then the device performs a second security check in response to wirelessly receiving an additional signal at the first circuitry of the electronic device, and this second security check is conditional on passing the first security check. In this case the powering up of at least the second circuitry of the electronic device is conditional on passing both the first and the second security checks.

Other embodiments had two different wake-up methods in parallel in which both needed to be performed in order to setup the device for the software/firmware update or for download of some other type of data such as music or games or personalization content. In this case the second circuitry of the electronic device is powered up in response to receiving the trigger signal at the first circuitry and an additional trigger signal at third circuitry of the electronic device. The first and the third circuitry may be any of the wireless receivers noted above, and additionally the third circuitry may be a timer. The first and third circuitries are distinct in that the third circuitry is not responsive to the first-said trigger signal and the first circuitry is not responsive to the additional trigger signal.

Respecting only the first and second circuitry, the first circuitry is characterized as operating at a lower power than the second circuitry, and the second circuitry comprises a broadband radio. In the examples above the second signal was given by example as a software update and/or a firmware update and/or a content update. Now in some embodiments if the software update and/or firmware update and/or content update is not fully received or not properly loaded after being received, at least the second circuitry of the electronic device is powered down and if a security check was done it is re-executed before the device again attempts to receive the software and/or firmware and/or content update. As noted by various examples above, such content may be customer-personalized data from the purchaser's old mobile terminal or some other personalization content.

These teachings were presented as quite advantageous for a portable electronic device such as a mobile terminal/user equipment disposed within packaging for retail sale.

The various blocks shown in FIGS. 7, 11, 12A-12D, 17, 18 and 19A-E may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

The various names used for the described parameters (e.g. advertising state, advertising event, flashing event, advertising packet data (PDU), scanWindow, Scan Interval, T_advEvent etc.) are not intended to be limiting in any respect, as these parameters may be identified by any suitable names. Further, the formulas and expressions that use these various parameters may differ from those expressly disclosed herein. Further, the various names assigned to different channels (e.g. advertising channel, channel index etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:

in response to wirelessly receiving a trigger signal at first circuitry of a portable electronic device, where the first circuitry is in a housing of the portable electronic device, performing a first security check by the first circuitry regarding the trigger signal with the first circuitry being powered by a battery of the portable electronic device;

[based upon] *in response to* the trigger signal passing the first security check, powering up at least second circuitry of the portable electronic device with use of the battery of the portable electronic device, where the second circuitry is in the same housing of the portable electronic device, and where the second circuitry is not powered up until the first circuitry determines that the trigger signal has passed the first security check;

wirelessly receiving a second signal at the powered up second circuitry;

performing a second security check regarding the second signal received by the second circuitry; and in response to determining that the second signal has passed the second security check, powering up third circuitry of the portable electronic device and wireless flashing of the portable electronic device based at least partially upon a third signal received by the portable electronic device, where the wireless flashing comprises use of a memory of the portable electronic device;

wherein the second signal is according to a radio access technology for which the trigger signal is incompatible, where the first circuitry operates at a lower [power] *point* than the second circuitry[, where power of the battery is conserved by not powering up the second circuitry] until after the first circuitry has determined that the trigger signal has passed the first security check.

2. The method according to claim 1, the method further comprising an initial step of:

upon expiration of a timer, the portable electronic device autonomously powering up the first circuitry which comprises a low power receiver for receiving the trigger signal.

3. The method according to claim 1, in which the second circuitry is not responsive to the said trigger signal and the first circuitry is not responsive to the second signal.

4. The method according to claim 1, in which the first circuitry is characterized as operating at a lower power than the second circuitry which comprises a broadband radio.

5. The method according to claim 1, in which the third signal is at least one of a software update and a firmware update and a content update.

6. The method according to claim 5, in which, when the software update and/or firmware update and/or the content update is not fully received or not properly loaded after being received, the method comprises:

powering down at least the second circuitry of the portable electronic device; and re-executing at least one of the security checks before again attempting to receive the said at least one of the software update and the firmware update and the content update.

7. The method according to claim 1, in which the first circuitry comprises at least one of:

a radio receiver for [Bluetooth,] near field communications, [Zigbee, ANT™, impulse-ultra] *impulse-extra* wideband, or radio frequency identification signals;

a timer; *or* a receiver of wireless audio or infrared; and circuitry for wirelessly receiving battery recharging signals.

8. The method according to claim 1, in which the portable electronic device comprises a user equipment and the method is executed while the user equipment is disposed within packaging for retail sale of the user equipment.

9. The method according to claim 1, the wireless flashing accomplishes rebooting of the portable electronic device and one or more of:

data transfer into the memory of the portable electronic device;

data removal from the memory of the portable electronic device;

installation or updating in the portable electronic device of software;

installation or updating in the portable electronic device of firmware.

10. The method according to claim 1, further comprising:

performing a third security check in response to wirelessly receiving an additional signal at the first circuitry of the portable electronic device, where powering up at least the second circuitry of the portable electronic device is conditional on passing both the first and the third security checks.

11. An apparatus, comprising:

at least one processor; and at least one non-transitory memory storing computer program code[, in which the memory and computer program code] are configured with the processor to cause the apparatus at least to perform:

in response to wirelessly receiving a trigger signal at first circuitry of the apparatus, where the apparatus is a portable electronic device, where the first circuitry is in a housing of the portable electronic device, performing a first security check by the first circuitry regarding the trigger signal with the first circuitry being powered by a battery of the apparatus;

[based upon] *in response to* the trigger signal passing the first security check, powering up at least second circuitry of the apparatus with use of the battery of the portable electronic device, *and* where the second circuitry is in the same housing of the portable electronic device, and where the second circuitry is not powered up until the first circuitry determines that the trigger signal has passed the first security check;

wirelessly receiving a second signal at the powered up second circuitry;

performing a second security check regarding the second signal received by the second circuitry; and in response to determining that the second signal has passed the second security check, powering up third circuitry of the portable electronic device and, wireless flashing of the apparatus based at least partially upon a third signal received by the portable electronic device, where the wireless flashing comprises use of the memory of the apparatus, wherein the second signal is according to a radio access technology for which the trigger signal is incompatible, where the first circuitry operates at a lower power than the second circuitry, where power of the battery is conserved by not powering up the second circuitry until after the first circuitry has determined that the trigger signal has passed the first security check.

12. The apparatus according to claim 11, in which the memory and computer program code are configured with the processor to cause the apparatus to further perform an initial step of:

upon expiration of a timer, autonomously powering up a low power receiver of the first circuitry for receiving the trigger signal.

13. The apparatus according to claim 11, in which the memory and computer program code are configured with the processor to cause the apparatus to further perform:

performing a third security check in response to wirelessly receiving an additional signal at the first circuitry of the apparatus, where powering up at least the second circuitry of the apparatus is conditional on passing both the first and the third security checks.

14. The apparatus according to claim 11, in which the second circuitry is not responsive to the said trigger signal and the first circuitry is not responsive to the second signal.

15. The apparatus according to claim 11, in which the first circuitry is characterized as operating at a lower power than the second circuitry which comprises a broadband radio.

16. The apparatus according to claim 11, in which the third signal is at least one of a software update and a firmware update and a content update.

17. The apparatus according to claim 16, in which if the software update and/or the firmware update and/or the content update is not fully received or not properly loaded after being received, the memory and computer program code are configured with the processor to cause the apparatus to further perform:

powering down at least the second circuitry of the apparatus;

re-executing at least one of the security checks before again attempting to receive the said at least one of the software update and the firmware update and the content update.

18. The apparatus according to claim 11, in which the first circuitry comprises one of:

a radio receiver for [Bluetooth,] near field communications, [Zigbee, ANT™,] impulse-ultra wideband, or radio frequency identification signals;

a timer; *or* a receiver of wireless audio or infrared; and circuitry for wirelessly receiving battery recharging signals.

19. The apparatus according to claim 11, in which the memory and computer program code are configured with the processor to cause the apparatus to further perform rebooting of the portable electronic device and one or more of:

data transfer into the memory of the portable electronic device;

data removal from the memory of the portable electronic device;

installation or updating in the portable electronic device of software;

installation or updating in the portable electronic device of firmware.

20. A non-transitory computer-readable memory storing software program instructions, which when executed by at least one data processor results in performance of operations that comprise:

in response to wirelessly receiving a trigger signal at first circuitry of a portable electronic device, where the first circuitry is in a housing of the portable electronic device, performing a first security check by the first circuitry regarding the trigger signal with the first circuitry being powered by a battery of the portable electronic device;

[based upon] *in response to* the trigger signal passing the first security check, powering up at least second circuitry of the portable electronic device with use of the battery of the portable electronic device, where the second circuitry is in the same housing of the portable electronic device, and where the second circuitry is not powered up until the first circuitry determines that the trigger signal has passed the first security check;

wirelessly receiving a second signal at the powered up second circuitry;

performing a second security check regarding the second signal received by the second circuitry; and in response to determining that the second signal has passed the second security check, powering up third circuitry of the portable electronic device and wireless flashing of the portable electronic device based at least partially upon a third signal received by the portable electronic device, where the wireless flashing comprises use of a memory of the portable electronic device;

wherein the second signal is according to a radio access technology for which the trigger signal is incompatible, where the first circuitry operates at a lower power than the second circuitry, where power of the battery is conserved by not powering up the second circuitry until after the first circuitry has determined that the trigger signal has passed the first security check.

*21. A method comprising:*

*in response to wirelessly receiving at least two trigger signals from at least two sources at least two circuitries of a portable electronic device, performing at least two security checks by the at least two circuitries regarding the at least two trigger signals from the at least two sources;*

*in response to the at least two trigger signals from the at least two sources passing the at least two security checks, powering up the at least one other circuitry is not powered up until the at least two circuitries determine that the at least two trigger signals from the at least two sources have passed the at least two security checks;*

*wirelessly receiving one other signal at the powered up at least one other circuitry;*

*performing at least one other security check regarding the one other signal received by the at least one other circuitry; and*

*in response to determining that the other signal has passed the at least one other security check, powering up at least a memory circuitry of the portable electronic device configured to wireless flash the portable electronic device.*

*22. The method according to claim 21, the method further comprising an initial step of:*

*upon expiration of a timer, the portable electronic device autonomously powering up a first one of the at least two circuitries which comprises a low power receiver for receiving a first one of the at least two trigger signals.*

*23. The method according to claim 21, in which a second one of the at least two circuitries is not responsive to a first one of the at least two trigger signals, and where a first one of the at least two circuitries is not responsive to a second one of the at least two trigger signals.*

*24. The method according to claim 21, in which a first one of the at least two circuitries is characterized as operating at a lower power in a second one of the at least two circuitries which comprises a broadband radio.*

*25. The method according to claim 21, in which the one other signal is at least one of:*

*a software update,*

*a firmware update, and*

*a content update.*

*26. The method according to claim 25, in which, when the software update and/or the firmware update and/or the content update is not fully received or not properly loaded after being received, the method comprises:*

*powering down at least a second one of the at least two circuitries of the portable electronic device; and*

*re-executing at least one of the security checks before again attempting to receive the at least one software update, firmware update, and content update.*

*27. The method according to claim 21, in which a first one of the at least two circuitries comprises at least one of:*

*a radio receiver for near field communications, impulse-ultra wideband or radio frequency identification signals;*

*a timer;*

*a receiver of wireless audio or infrared; or*

*circuitry for wirelessly receiving battery recharging signals.*

*28. The method according to claim 21, in which the portable electronic device comprises a user equipment and the method is executed while the user equipment is disposed within packaging for retail sale of the user equipment.*

*29. The method according to claim 21 where a first one of the at least two circuitries is powered by a wireless charging and a second one of the at least two circuitries is powered by a battery of the portable electronic device.*

*30. The method according to claim 29 where the wireless charging occurs before the second circuitry is powered by the battery.*

*31. The method according to claim 29 where the second one of the at least two circuitries is powered by the battery before the first one of the at least two circuitries is powered by the wireless charging.*

*32. The method according to claim 21 where the at least two security checks by the at least two circuitries, regarding the at least two trigger signals, occur at a same time.*

*33. The method according to claim 21 where the at least two security checks by the at least two circuitries, regarding the at least two trigger signals, occur one after the other.*

*34. A method comprising:*

*in response to wirelessly receiving at least two different trigger signals from at least two respective sources at*

*two or more circuitries of a portable electronic device which are at least partially different, performing at least two security checks by the two or more circuitries regarding the at least two different trigger signals;*

*in response to the at least two different trigger signals passing the at least two security checks, powering up at least one other circuitry of the portable electronic device which is at least partially different from the other two or more circuitries, where at least one other circuitry is not powered up until after the two or more circuitries determine that the at least two different trigger signals from the at least two sources have passed the at least two security checks;*

*after the at least one other circuitry has been powered up, wirelessly receiving at least one other signal at the least one other circuitry;*

*performing at least one other security check regarding the at least one other signal received by the at least one other circuitry; and*

*in response to determining that the at least one other signal has passed the at least one other security check, powering up at least a memory circuitry of the portable electronic device to wirelessly flash the portable electronic device.*

*35. The method according to claim 34 further comprising an initial step of:*

*upon expiration of a timer, the portable electronic device autonomously powering up a first one of the two or more circuitries, where the first circuitry comprises a low power receiver for receiving a first one of the at least two different trigger signals.*

*36. The method according to claim 34, in which a second one of the two or more circuitries is not responsive to a first one of the at least two different trigger signals, and where a first one of the two of more circuitries is not responsive to a second one of the at least two different trigger signals.*

*37. The method according to claim 34, in which a first one of two or more circuitries is characterized as operating at a lower power than a second one of the two or more circuitries which comprises a broadband radio.*

*38. The method according to claim 34, in which the at least one other signal is at least one of:*

*a software update;*

*a firmware update, and*

*a content update.*

*39. The method according to claim 38, in which, when the software update and/or the firmware update and/or the content update is not fully received or not properly loaded after being received, the method comprises:*

*powering down at least a second one of the two or more circuitries of the portable electronic device; and*

*re-executing at least one of the at least two security checks before again attempting to receive the at least one software update, firmware update, and content update.*

*40. The method according to claim 34, in which a first one of the two or more circuitries comprises at least one of:*

*a radio receiver for near field communications, impulse-ultra wideband, or radio frequency identification signals;*

*a timer;*

*a receiver of wireless audio or infrared; or*

*circuitry for wirelessly receiving battery recharging signals.*

*41. The method according to claim 34, in which the portable electronic device comprises a user equipment, and where the method is executed while the user equipment is disposed within packaging for retail sale of the user equipment.*

*42. The method according to claim 34 where a first one of the at least two security checks is performed on a first one of the at least two different trigger signals by a first one of the two or more circuitries, and where a second one of the at least two security checks is performed on a second one of the at least two different trigger signals by a second one of the two or more circuitries, where the second circuitry is not powered up and the second security check is not performed unless the first trigger signal passes the first security check.*

* * * * *